US011122515B2

(12) United States Patent
MolavianJazi et al.

(10) Patent No.: US 11,122,515 B2
(45) Date of Patent: Sep. 14, 2021

(54) UE POWER CONTROL FOR MULTIPLE UPLINK CARRIERS

(71) Applicant: Lenovo (Singapore) PTE. LTD., New Tech Park (SG)

(72) Inventors: Ebrahim MolavianJazi, Lincolnwood, IL (US); Joachim Loehr, Wiesbaden (DE); Hyejung Jung, Northbrook, IL (US); Vijay Nangia, Woodridge, IL (US); Prateek Basu Mallick, Dreieich (DE)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 100 days.

(21) Appl. No.: 16/377,004

(22) Filed: Apr. 5, 2019

(65) Prior Publication Data
US 2019/0313343 A1  Oct. 10, 2019

Related U.S. Application Data

(60) Provisional application No. 62/653,482, filed on Apr. 5, 2018.

(51) Int. Cl.
*H04W 52/14* (2009.01)
*H04W 52/08* (2009.01)
(Continued)

(52) U.S. Cl.
CPC ......... *H04W 52/146* (2013.01); *H04W 52/08* (2013.01); *H04W 52/281* (2013.01);
(Continued)

(58) Field of Classification Search
CPC ............. H04W 52/146; H04W 52/281; H04W 52/367
(Continued)

(56) References Cited

U.S. PATENT DOCUMENTS

| 2011/0026419 A1* | 2/2011 | Kim ............... H04W 52/281 370/252 |
| 2011/0237289 A1 | 9/2011 | Fodor et al. |

(Continued)

FOREIGN PATENT DOCUMENTS

| EP | 2830245 A1 | 1/2015 |
| WO | 2012002684 A2 | 1/2012 |
| WO | 2015034299 A1 | 3/2015 |

OTHER PUBLICATIONS

PCT/IB2019/000352, "Notification of Transmittal of the International Search Report and the Written Opinion of the International Searching Authority, or the Declaration", dated Sep. 26, 2019, pp. 1-20.

(Continued)

*Primary Examiner* — John J Lee
(74) *Attorney, Agent, or Firm* — Kunzler Bean & Adamson

(57) ABSTRACT

Apparatuses, methods, and systems are disclosed for UE power control for multiple uplink carriers. One apparatus includes a transceiver that performs a random-access procedure, wherein performing the random-access procedure includes transmitting a physical uplink shared channel ("PUSCH") Msg3. The apparatus includes a processor that determines whether the apparatus is in RRC_CONNECTED state and identifies a number of configured closed-loop power control ("CL-PC") process for an uplink ("UL") channel or signal. The processor calculates a transmit power for the PUSCH Msg3 using a CL-PC process with index zero in response to the apparatus being in RRC_CONNECTED state and the number of configured CL-PC processes for the UL channel or signal being more than one.

6 Claims, 10 Drawing Sheets

(51) Int. Cl.
| | |
|---|---|
| H04W 52/28 | (2009.01) |
| H04W 52/36 | (2009.01) |
| H04W 52/44 | (2009.01) |
| H04W 52/50 | (2009.01) |
| H04W 76/27 | (2018.01) |
| H04W 74/00 | (2009.01) |
| H04W 74/08 | (2009.01) |

(52) U.S. Cl.
CPC ....... *H04W 52/365* (2013.01); *H04W 52/367* (2013.01); *H04W 52/44* (2013.01); *H04W 52/50* (2013.01); *H04W 74/002* (2013.01); *H04W 74/0833* (2013.01); *H04W 76/27* (2018.02)

(58) Field of Classification Search
USPC ................................ 455/522, 69, 452.1, 509
See application file for complete search history.

(56) References Cited

U.S. PATENT DOCUMENTS

| | | | |
|---|---|---|---|
| 2011/0319112 A1 | 12/2011 | Jeong et al. | |
| 2013/0051297 A1* | 2/2013 | Kim ................. | H04W 52/146 370/311 |
| 2015/0087296 A1 | 3/2015 | Kim et al. | |
| 2015/0092713 A1 | 4/2015 | Pelletier et al. | |
| 2016/0205632 A1* | 7/2016 | Yi ..................... | H04W 52/146 455/522 |
| 2019/0313348 A1 | 10/2019 | MolavianJazi et al. | |
| 2020/0245258 A1* | 7/2020 | Wang ................ | H04W 52/281 |

OTHER PUBLICATIONS

ZTE, Sanechips, "Offline summary for AI 7.1.6.1 NR UL power control in non-CA aspects", 3GPP TSG RAN WG1 Meeting #92 R1-1803356, Feb. 26-Mar. 2, 2018, pp. 1-10.

Motorola Mobility, Lenovo, "On non-CA NR UL power control", 3GPP TSG RAN WG1 #92 R1-1802678, Feb. 26-Mar. 2, 2018, pp. 1-6.

U.S. Appl. No. 16/377,050, Office Action Summary, dated Oct. 30, 2019, pp. 1-15.

PCT/IB2019/000352, "Invitation to Pay Additional Fees and, Where Applicable, Protest Fee", PCT International Searching Authority, dated Jul. 15, 2019, pp. 1-15.

PCT/IB2019/000351, "Invitation to Pay Additional Fees and, Where Applicable, Protest Fee", PCT International Searching Authority, dated Jul. 15, 2019, pp. 1-16.

Samsung, "Offline summary of UL power control—CA aspects", 3GPP TSG RAN WG1 Meeting 91 R1-1721548, Nov. 27-Dec. 1, 2017, pp. 1-9.

Ericsson, "Power Headroom Reporting in NR", 3GPP TSG-RAN WG2 #100 Tdoc R2-1713484, Nov. 27-Dec. 1, 2017, pp. 1-4.

Huawei, Hisilicon, "Remaining details for uplink power control with CA", 3GPP TSG RAN WG1 Meeting #92 R1-1801808, Feb. 26-Mar. 2, 2018, pp. 1-6.

Huawei, Hisilicon, "Designs on power headroom calculation and reporting", 3GPP TSG RAN WG1 Meeting #91 R1-1719435, Nov. 27-Dec. 1, 2017, p. 1-6.

LG Electronics, "Discussion on uplink power headroom report for NR", 3GPP TSG RAN WG1 NR Ad-Hoc#2 R1-1710357, Jun. 27-30, 2017, pp. 1-4.

Motorola Mobility, Lenovo, "On CA-related NR UL power control", 3GPP TSG RAN WG1 #91 R1-1720929, Nov. 27-Dec. 1, 2017, pp. 1-4.

3GPP, "3rd Generation Partnership Project; Technical Specification Group Radio Access Network; NR; Physical layer procedures for control (Release 15)", 3GPP TS 38.213 V15.0.0, Dec. 2017, pp. 1-56.

Vivo, "Remaining issues on NR UL power control", 3GPP TSG RAN WG1 Meeting #92 R1-1801546, Feb. 26-Mar. 2, 2018, pp. 1-5.

Oppo, "Text proposal for uplink power control", 3GPP TSG RAN WG1 Meeting AH 1801 R1-1800486, Jan. 22-26, 2018, pp. 1-9.

3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.0.0, Dec. 2017, pp. 1-49.

U.S. Appl. No. 16/984,012, Office Action Summary, dated Sep. 17, 2020, pp. 1-14.

* cited by examiner

UE POWER CONTROL FOR MULTIPLE UPLINK CARRIERS

CROSS-REFERENCE TO RELATED APPLICATIONS

This application claims priority to U.S. Provisional Patent Application No. 62/653,482 entitled "POWER CONTROL WITH BANDWIDTH PART AND SUPPLEMENTARY UPLINK OPERATION" and filed on Apr. 5, 2018 for Ebrahim MolavianJazi, Joachim Loehr, Hyejung Jung, Vijay Nangia, and Prateek Basu Mallick, which is incorporated herein by reference.

FIELD

The subject matter disclosed herein relates generally to wireless communications and more particularly relates to power control for a UE, especially when configured with multiple bandwidth parts and/or supplementary uplink carrier.

BACKGROUND

The following abbreviations are herewith defined, at least some of which are referred to within the following description: Third Generation Partnership Project ("3GPP"), Positive-Acknowledgment ("ACK"), Bandwidth Part ("BWP"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Licensed Assisted Access ("eLAA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Non-Supplementary Uplink ("NUL", e.g., a "normal" uplink carrier), Orthogonal Frequency Division Multiplexing ("OFDM"), Primary Cell ("PCell"), Primary Secondary Cell ("PSCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINK"), Supplementary Uplink ("SUL"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, such as 5G NR, a UE is expected to be configured with one or multiple downlink bandwidth parts ("DL BWP"). In addition, in 5G NR it is possible to supplement an additional frequency band to an NR serving cell, referred to as supplementary uplink ("SUL"). However, conventional power control ("PC") and power headroom report ("PHR") are suboptimal for and/or incompatible with BWP and SUL operations.

BRIEF SUMMARY

Methods are disclosed for UE power control for multiple UL carriers. Apparatuses and systems also perform the functions of the methods. The methods may also be embodied in one or more computer program products comprising executable code.

A first method for UE power control for multiple UL carriers includes receiving a configuration of a plurality of uplink carriers for a serving cell and calculating a total transmit power for uplink transmissions on the plurality of uplink carriers, the uplink transmissions overlapping in time. The first method includes determining a configured maximum output power and identifying a lower priority uplink carrier of the plurality of uplink carriers according to a priority rule in response to the uplink transmissions having the same priority level. The first method includes reducing transmission power for the lower priority uplink carrier in response to the total transmit power exceeding the configured maximum output power in any part of the overlapping uplink transmissions and performing uplink transmission using the reduced transmission power.

A second method for UE power control for multiple UL carriers includes receiving a configuration of a plurality of uplink carriers for a serving cell and calculating a PH for each uplink carrier of the plurality of uplink carriers on the serving cell. The second method includes transmitting a PHR based on the calculated PH for the plurality of uplink carriers of the serving cell.

A third method for UE power control for multiple UL carriers includes performing a random-access procedure, wherein performing the random-access procedure includes transmitting a PUSCH Msg3. The third method includes determining whether the UE is in RRC_CONNECTED state and identifying a number of configured CL-PC process for an UL channel or signal. The third method includes calculating the transmit power for the PUSCH Msg3 using a CL-PC process with index zero in response to the UE being in RRC_CONNECTED state and the number of configured CL-PC processes for the UL channel or signal being more than one.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
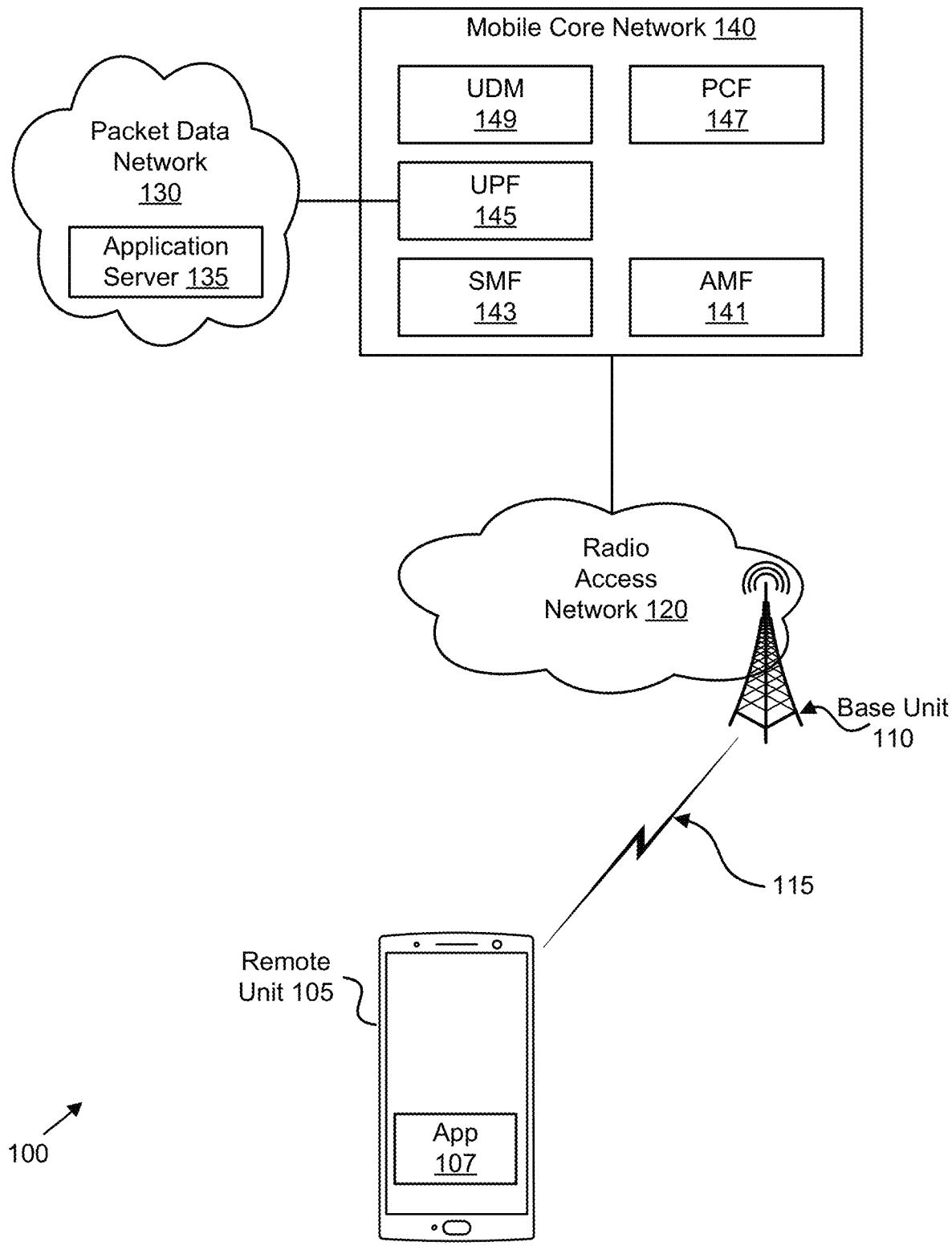
FIG. 1 is a schematic block diagram illustrating one embodiment of a wireless communication system for UE power control for multiple UL carriers.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for PC and PHR related configuration and operation methods for BWP and SUL operation, including: Configuration of power control parameters for BWP operation; Resetting closed-loop power control when switching the active BWP(s); Priority rule for power allocation across uplink carriers (including supplementary uplink ("SUL") carriers and normal (non-supplementary) uplink ("NUL") carriers) and uplink BWPs; PHR format and PHR triggering conditions when operating with BWP(s); Configuration of default settings for virtual PHR when operating with BWPs and/or SUL.

The various embodiments described herein applies generally to UL transmissions. UL transmissions can include PUSCH, PUCCH, SRS, and/or PRACH transmissions. In the various embodiments, an antenna port is defined such that the channel over which a symbol on the antenna port is conveyed can be inferred from the channel over which another symbol on the same antenna port is conveyed. One or more antenna ports are used for UL transmissions.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

Two antenna ports are said to be Quasi Co-Located ("QCL") if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties. Spatial Rx parameters may include one or more of: angle of arrival ("AoA"), Dominant AoA, average AoA, angular spread, Power Angular Spectrum ("PAS") of AoA, average angle of departure ("AoD"), PAS of AoD, transmit/receive channel correlation, transmit/receive beamforming, spatial channel correlation etc.

Carrier aggregation ("CA") allows joint transmission/reception operation in a collection of serving cells or component carriers ("CCs"), which are collectively called a cell group ("CG"). In legacy 4G LTE network deployments, each downlink ("DL") or uplink ("UL") CC includes only a single contiguous transmission bandwidth within which a UE can be scheduled for reception/transmission.

In 5G New Radio ("NR") deployments, transmission and reception may include both centimeter- and millimeter-wave bands and higher frequency bands, e.g., from 6 GHz up to 70 GHz. These frequency band are expected to be one of the key deployment scenarios. In such high frequency bands, a carrier bandwidth can be up to 400 MHz (or wider), and each carrier may consist of multiple non-contiguous chunks of spectrum. Because (i) the UE receive channel bandwidth can be smaller than the carrier bandwidth, (ii) non-contiguous spectrum may be used for one carrier, and (iii) multiple numerologies can be configured within one carrier, bandwidth parts ("BWPs") based operation was developed in 5G NR.

Each BWP consists of a group of contiguous physical resource blocks ("PRBs") and is associated with a certain numerology (e.g., subcarrier spacing in OFDM operation) and/or service (e.g., eMBB or URLLC). Some of the usecases for BWPs are to support, e.g., reduced UE bandwidth capability; reduced UE energy consumption by means of bandwidth adaptation; frequency division multiplexing ("FDM") of different numerologies; and non-contiguous spectrum.

In BWP operation, a UE is configured with one or multiple DL BWPs used for DL reception, and one or multiple UL BWPs used for UL transmission. For example, in 5G NR Release 15 ("Rel-15"), UE may be configured with up to four DL BWPs and up to four UL BWPs in a given serving cell. The configured DL and UL BWPs with the same BWP index for a serving cell are considered to have the same center frequency location in TDD operation, but may have distinct frequency locations in FDD operation (e.g., below 6 GHz) while not necessarily spaced at the frequency division duplex spacing.

An initial DL BPW is defined as the DL BWP of a serving cell (PCell, PSCell, and/or SCell) which corresponds to control resource set ("CORESET") for Type0-PDCCH common search space which is used for scheduling reception of the Remaining Minimum System Information ("RMSI"). An initial UL BWP is defined as the UL BWP of a primary serving cell (PCell or PSCell) on which at least initial random-access procedure occurs.

An active DL/UL BWP is defined as the DL/UL BWP on a serving cell on which data reception/transmission can occur. The active DL/UL BWP may be the same as the initial DL/UL BWP. As of 3GPP NR Rel-15, the UE is not expected to monitor or make measurements on any configured BWP other than the active DL/UL BWP.

The active DL/UL BWP can dynamically change. For example, a BWP indicator field in downlink control information ("DCI") for DL-assignment/UL-grant may be used to indicate which of the configured DL/UL BWPs are currently active for DL reception/UL transmission. If the active DL BWP has been unused (e.g., no DCI has been received on that DL BWP) for a long time, then the UE may fall back to a so-called default DL BWP, which is either the initial DL BWP or another DL BWP (e.g., configured by higher-layers).

Additionally, in 5G NR it is possible to pair/supplement an additional uplink carrier to an NR serving cell (in both TDD and FDD operation) as a complementary access link only for UL transmission purposes, so that two ULs are paired with a single DL in the NR serving cell. This additional carrier may be in the same frequency band or in a different frequency band as the normal. Such an additionally paired uplink carrier to a serving cell is called a supplementary (or secondary) uplink ("SUL"). For example, a SUL carrier on 700 MHz can complement/supplement the "normal" UL carrier (e.g., non-SUL carrier, also referred to as the "NUL" carrier) on 4, 30, or 70 GHz, where the SUL carrier can provide enhanced uplink coverage compared to the NUL carrier. In some cases, the NR SUL carrier may fully or partially overlap in frequency with an LTE UL carrier.

In terms of the interworking of BWP and SUL, note that, if a SUL carrier is configured for a serving cell, the SUL can have an independent/separate set of (e.g., up to 4) UL BWPs configured for the UE. Therefore, in NR Rel-15, for a serving cell configured with an SUL carrier, there can be one active UL BWP on the NUL carrier (e.g., non-SUL carrier) and one active UL BWP on the SUL carrier. Moreover, an initial UL BWP can be configured on the SUL carrier in addition to that configured for the NUL carrier of the primary serving cell.

Transmit power control (PC) and power headroom report (PHR) are important elements of UE operation. PC and PHR for non-CA (e.g., single cell) and CA scenarios already have been well discussed for previous generations of cellular communication systems, such as in LTE. However, specification of PC and PHR behavior in 5G NR would involve BWP operation and SUL carriers and lead to novel situations and scenarios.

Power control and power headroom formulas that involve some aspects of BWP operation have been adopted for 5G operation. For example, if a UE transmits a PUSCH on UL BWP b of UL carrier f of serving cell c using parameter set configuration with index j and PUSCH power control adjustment state with index l, the UE determines the PUSCH transmission power $P_{PUSCH,b,f,c}(i,j,q_d,l)$ in PUSCH transmission occasion i as $$P_{PUSCH,b,f,c}(i, j, q_d, l) = \min \left\{ \begin{array}{l} P_{CMAX,f,c}(i) \\ P_{0\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

Equation 1 where the PUSCH transmission power of Equation 1 is in [dBm], where all parameters in the calculation are defined in 3GPP TS 38.213 (ver. 15.0.0), which is incorporated herein by reference.

Many PC parameters are configured per UL BWP, including: the UE-specific component of target power spectral density ("PSD") value 'P0_UE', the fractional pathloss compensation factor $\alpha$, the pathloss ("PL") reference, the closed-loop power control ("CL-PC") process, and the transmission bandwidth (e.g., number of PRBs) allocation. However, the configured maximum UE transmit power, '$P_{CMAX,f,c}$,' and the nominal component of target PSD value, 'P0_nominal,' may be configured per UL carrier of a serving cell, without regard to the choice of UL BWP.

In a related example, a PUSCH PHR dependent on the UL BWP may be defined in a similar fashion as follows: If a UE transmits PUSCH in PUSCH transmission occasion i on UL BWP b of UL carrier f of serving cell c, the UE computes an actual power headroom in [dB] for a Type 1 report. Thus, if the UE determines that a Type 1 power headroom report for an activated serving cell is based on an actual PUSCH transmission, then then for PUSCH transmission occasion i on active UL BWP b of carrier f of serving cell c, the UE computes the Type 1 power headroom report as $$PH_{type1,b,f,c}(i,j,q_d,l) = P_{CMAX,f,c}(i) - \{P_{0\_PUSCH,b,f,c}(j)+) + \\ 10 \log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i,l)\}$$

Equation 2

If the UE does not transmit PUSCH in PUSCH transmission occasion i on UL BWP b of UL carrier f of serving cell c, then the UE cannot report an actual power headroom. This is due to the fact that if there is no PUCCH/PUSCH transmission in transmission occasion i, then $P_{CMAX,f,c}(i)$ cannot be determined. The UE instead reports a "virtual" power headroom based on a reference PUSCH transmission. Accordingly, if the UE determines that a Type 1 power headroom report for an activated serving cell is based on a reference PUSCH transmission, then for PUSCH transmission occasion i on active UL BWP b of carrier f of serving cell c, the UE computes the Type 1 power headroom report in [dB] as $$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}$$  Equation 3 where $\tilde{P}_{CMAX,f,c}(i)$ is computed assuming MPR=0 dB, A-MPR=0 dB, P-MPR=0 dB, ΔTc=0 dB, where MPR, A-MPR, P-MPR and $\Delta T_C$ are power reduction/backoff terms. These power reduction/backoff terms are all defined in 3GPP TS 38.101 Rel-15. Note that as of NR Rel-15, only one PHR per serving cell is supported; however, future phases of 3GPP NR (e.g., beyond 5G NR Rel-15) may support multiple PHR per serving cell.

Regarding BWP operation for power control, at the time of invention it is not defined whether it is needed to configure the same or different power control parameters and pathloss measurement reference resources in each BWP and to reset a closed-loop power control process or not upon changing an active BWP are dependent on deployment and operational scenarios. Thus, a network entity ("NE"), such as gNB or other RAN node, may select proper configuration and operation modes and explicitly or implicitly indicate to a UE. Furthermore, virtual PHR configuration may correspond to a default setting, instead of a gNB configured setting, in which case the default setting for the UL carrier and the UL BWP need to be specified. In addition, in the case that multiple active BWPs are supported, PC parameters as well as PHR triggering conditions and PHR format should consider the number of configured BWPs and the number of active BWPs, which are not discussed in previous works.

FIG. 1 depicts a wireless communication system 100 for UE power control for multiple UL carriers, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 135 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 135 in the packet data network 130 using the PDU session. Note that the remote unit 105 may establish one or more PDU sessions (or other data connections) with the mobile core network 140. As such, the remote unit 105 may concurrently have at least one PDU session for communicating with the packet data network 130 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 130, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for UE power control for multiple UL carriers apply to other types of communication networks, including IEEE 802.11 variants, UMTS, LTE variants, CDMA 2000, Bluetooth, and the like. For example, in an LTE/EPC variant, the AMF 141 may be mapped to an MME, the SMF 143 may be mapped to a control plane portion of a PGW, the UPF 145 may be mapped to a STW and a user plane portion of the PGW, etc.

The remote unit 105 may be configured for UL BWP and SUL. Moreover, the remote unit 105 may be configured with a maximum UE transmit power on a serving cell c and UL carrier f. In various embodiments, the remote unit 105 performs uplink transmission on one or a plurality of active UL BWPs using the determined transmit power value. The various embodiments described herein applies generally to UL transmissions. UL transmissions may include PUSCH, PUCCH, SRS, or PRACH transmissions.

In one embodiment, in a single-cell or carrier-aggregation operation, simultaneous transmissions (e.g., transmissions having the same or different starting time instance and/or length of the transmissions) may occur on different active UL BWP(s) of different uplink carrier and/or serving cells, leading to partial or full overlap between different UL transmissions. In such embodiments, if the aggregated transmit power for the remote unit 105 across all corresponding uplink carriers and/or serving cells in any symbols/portions/parts of the UL transmissions exceeds the configured maximum UE transmit power, e.g., $P_{CMAX}$, then the remote unit 105 reduces power, e.g., by applying a power down-scaling factor and/or drops transmission on the UL BWPs/carriers/cells.

Figure 2:
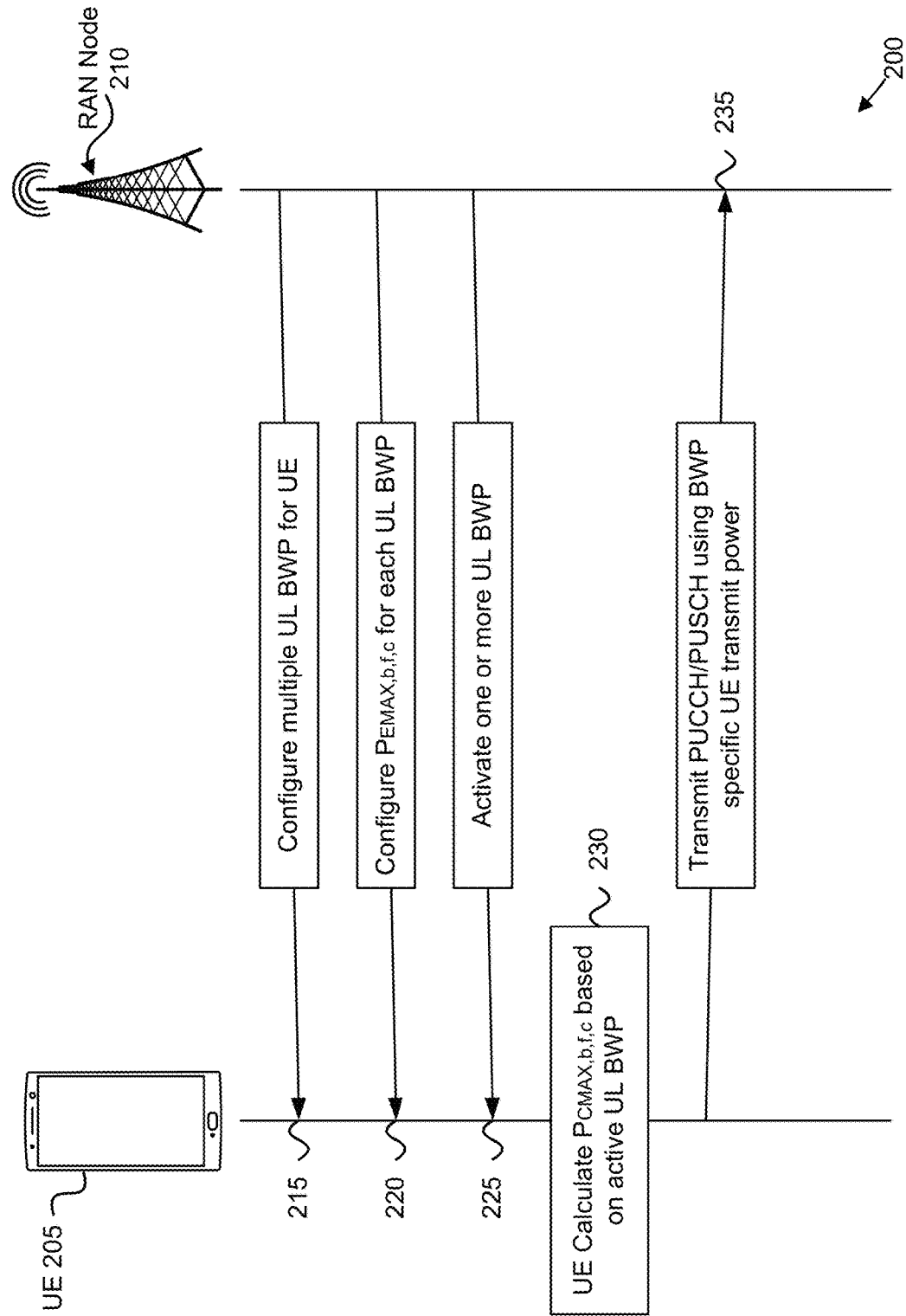
FIG. 2 is a block diagram illustrating one embodiment of power control for a UE configured with multiple uplink bandwidth parts.

FIG. 2 depicts a network architecture 200 for UE power control for multiple UL carriers, according to embodiments of the disclosure. The network architecture 200 includes a UE 205 and a RAN Node 210. The UE 205 may be one embodiment of the remote unit 105, described above. The RAN Node 210 (e.g., a gNB) may be one embodiment of the base unit 110, described above.

In LTE, a configured maximum UE transmit/output power for a serving cell c is denoted as $P_{CMAX,C}$ and is essentially defined as the UE power class minus some power reduction terms (e.g., MPR, A-MPR, P-MPR, $\Delta T_C$). A similar definition is adopted so far for 5G NR, with the extension that separate $P_{CMAX,f,c}$ is defined for each UL carrier f (e.g., NUL and SUL) of a serving cell c.

As depicted, the RAN Node 210 may configure the UE 205 with multiple UL BWP (see messaging 215). In some embodiments, the configured maximum UE output power on a serving cell c and UL carrier f is also a function of the UL BWP, that is, $P_{CMAX,b,f,c}$. As depicted, the RAN Node 210 may configure the UE 205 with $P_{CMAX,b,f,c}$ for each configured UL BWP (see messaging 220). Additionally, various specified maximum power reduction terms (e.g., MPR, A-MPR, P-MPR, $\Delta T_C$) and/or the maximum allowed UE output power signaled by higher layers for UL carrier f and serving cell c ('$P_{EMAX,f,c}$' in the $P_{CMAX,b,f,c}$ formula) are configured per UL BWP, so that parameters MPR_b,f,c or $P_{EMAX,b,f,c}$, etc., are specified and/or configured.

Different MPR limits may be applicable for different UL BWPs of an uplink carrier, the applicable limits may be specified and/or configured to the UE. For example, a first BWP that is not near the frequency band-edge can have a first MPR limit, while a second BWP that is at the frequency band-edge can have a second MPR limit. The second MPR limit may be more stringent than the first MPR limit.

Similarly, a UE may be configured by higher layers with different values of maximum allowed UE output power ($P_{EMAX,b,f,c}$) for different UL BWPs (see messaging 220). For example, a first BWP that is not near the frequency band-edge can have a first value of maximum allowed UE output power, while a second BWP that is at the frequency band-edge can have a second value of maximum allowed UE output power. The second value of maximum allowed UE output power may be smaller than the first value of maximum allowed UE output power.

In one example, if the frequency distance between one UL BWP (or a first set of UL BWPs) and another UL BWP (or a second set of UL BWPs) (e.g., as the distance between the highest frequency of the first set of UL BWPs and the lowest frequency of the second set of UL BWPs) is greater than a certain, predetermined/configured threshold, then the configured values for some or all of the specified maximum power reduction terms (e.g., MPR, A-MPR, P-MPR, $\Delta T_C$) and/or the configured maximum allowed UE output power $P_{EMAX,b,f,c}$, and therefore the configured $P_{CMAX,b,f,c}$ for the first set of UL BWPs may be different from those of the second set of UL BWPs.

In one example, if the UE uses or if it is assumed that the UE uses different power amplifiers (PAs) for UL transmission on different UL BWPs of an UL carrier of a serving cell, then different $P_{CMAX,b,f,c}$ values can be set for different PAs. Thus, $P_{CMAX,b,f,c}$ may be calculated under the assumption that the transmit power is increased independently on different UL BWPs of UL carrier f of serving cell c. In one example, if the UE uses or if it is assumed that the UE uses a common power amplifiers (PA) for UL transmission on different BWPs of an UL carrier of a serving cell, $P_{CMAX,b,f,c}$ may be calculated under the assumption that the transmit power is increased by the same amount in dB on the different UL BWPs of UL carrier f of serving cell c. In this case, for each of the MPR terms, a single value that is common to different UL BWPs may be used; however, the maximum allowed UE output power $P_{EMAX,b,f,c}$ can be configured to different values for the different UL BWPs of UL carrier f of serving cell c.

Moreover, the RAN Node 210 may activate one or more UL BWP of the UE 205 (see messaging 225). Accordingly, the UE 205 may calculate $P_{CMAX,b,f,c}$ based on the active UL BWP(s) (see block 230). The UE 205 transmits PUCCH and/or PUSCH using BWP-specific UE transmit power (e.g., based on $P_{CMAX,b,f,c}$) (see messaging 235).

In certain embodiments, the configured maximum UE transmit power on a serving cell c and UL carrier f is not a function of the bandwidth part, that is, $P_{CMAX,f,c}$. In one example, the specified maximum power reduction terms (e.g., MPR, A-MPR, P-MPR, $\Delta T_C$) in the $P_{CMAX,f,c}$ formula can be independent of the UL BWP, e.g., they take on the same values for all configured UL BWPs within a carrier of a serving cell, so that $P_{CMAX,f,c}$ is the same regardless of the active UL BWP. This can be useful, e.g., when there is only one active UL BWP per UL carrier of a serving cell (e.g., as in 5G NR Rel-15).

In another example, the power reduction terms for each individual UL BWP of a given UL carrier of a serving cell can be the same or different, but to define/configure the maximum UE transmit power for the overall operation an UL carrier of a serving cell, "multi-cluster" maximum power reduction terms (e.g., "multi-cluster" MPR, A-MPR, P-MPR, $\Delta T_C$) are specified, which refer to power reduction for non-contiguous allocations of scheduled PRBs across (and possibly also within) different UL BWPs of an UL carrier f of a serving cell c, e.g., in terms of sums of individual MPR, A-MPR, P-MPR terms across UL BWPs, similar to "multi-cluster" power reduction terms in LTE for CA operation with non-contiguous PRB allocation within one serving cell [3GPP TS 36.101]. This can be useful, e.g., when transmission on multiple active UL BWPs within an UL carrier of a serving cell is supported (e.g., in 5G NR Phase 2, e.g., beyond Rel-15).

Figure 3:
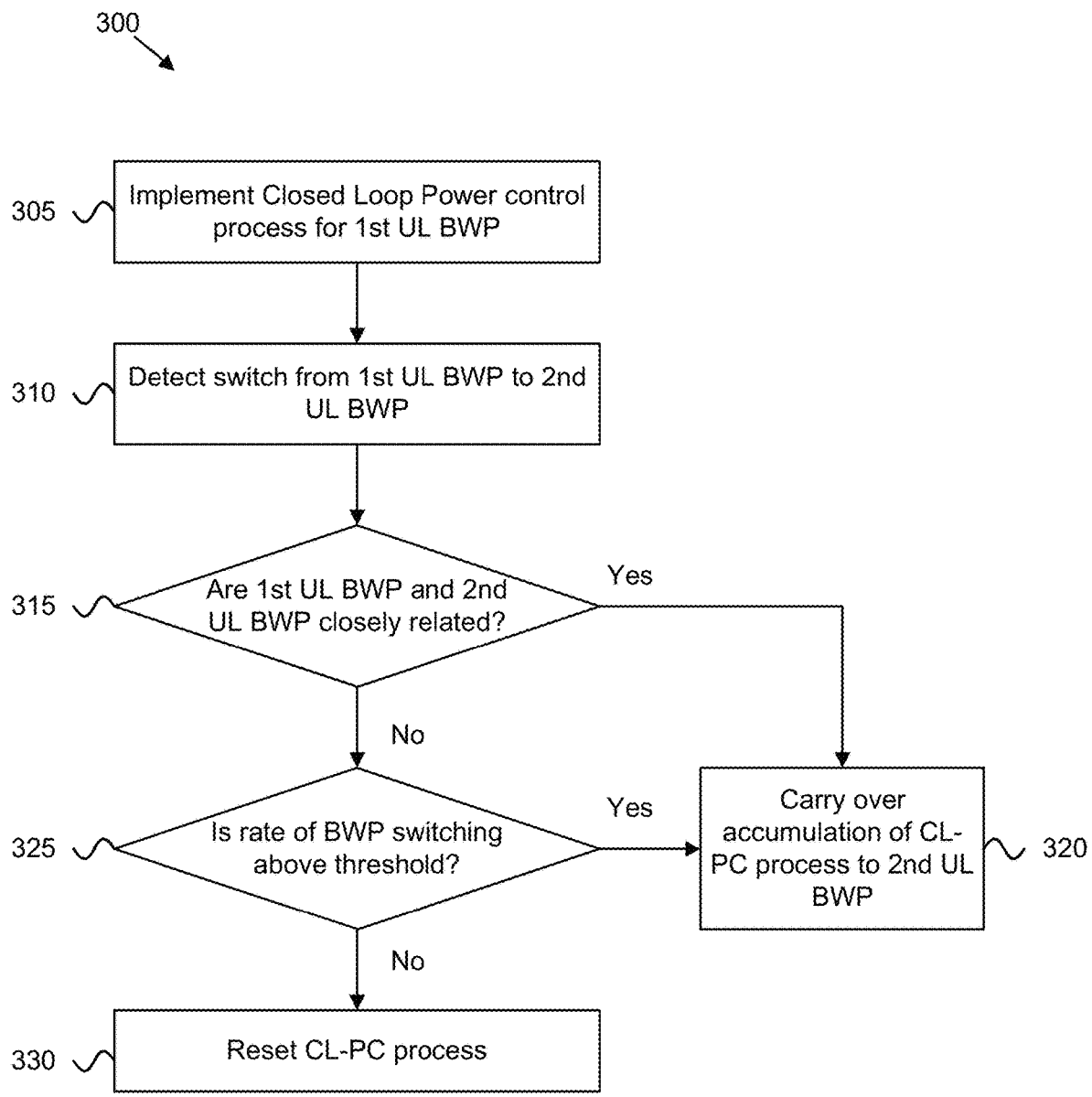
FIG. 3 is a block diagram illustrating one embodiment of power control process management upon switching active uplink bandwidth parts.

FIG. 3 depicts a procedure 300 for UE power control for multiple UL carriers, according to embodiments of the disclosure. The procedure 300 may be performed by a UE, such as the remote unit 105 and/or the UE 205. Here, the UE is configured with multiple BWPs for a UL carrier (e.g., of a serving cell).

The procedure 300 begins as the UE implements a closed loop power control ("CL-PC") process for a first BWP of the UL carrier (see block 305). Here, it is presumed that the CL-PC process is in accumulative mode. The UE detects a switch from the first UL BWP to a second configured UL BWP (see block 310). In response to the switch, the UE determines whether the first UL BWP and the second UL BWP are closely related using one or more of the factors discussed below (see decision block 315). If the first UL BWP and second UL BWP are closely related, then the UE carries over the power control accumulation status for the CL-PC process to the second UL BWP (see block 320).

However, if the first UL BWP and second UL BWP are not closely related, then the UE may check whether a rate of BWP switching is above a threshold amount (see decision block 325). Here, if the rate of BWP switching is above a threshold amount, then the UE carries over the power control accumulation status for the CL-PC process to the second UL BWP (see block 320). Otherwise, if the rate of BWP switching is not above a threshold amount, then the UE resets the power control accumulation status for the CL-PC process to the second UL BWP (see block 330). Note that in certain embodiments, the UE may be configured to ignore the rate of BWP switching. In such embodiments, the UE resets the power accumulation status of the CL-PC if the first UL BWP and second UL BWP are not closely related.

In various embodiments, one or multiple CL-PC processes may be shared between different UL BWPs of an UL carrier of a serving cell. For example, there may be a total number (e.g., two) of CL-PC processes shared among all UL BWPs of a serving cell. In another example, there may be 2×N CL-PC processes configured for an UL carrier of a serving cell, where N is the number of active UL BWPs of the UL carrier. In such embodiments, if switching of one (or multiple) active UL BWP(s) occur(s) (e.g., a switch from the first active UL BWP to the second active UL BWP), then the CL-PC process associated with the now inactive UL BWP may be used as the power control adjustment status for the new active UL BWP(s) according to the mapping between old and new UL BWP(s). Beneficially, carrying over the CL-PC process avoids abrupt UE transmit power changes and potential phase discontinuity issues.

As discussed above, if CL-PC process is in the accumulative mode and if BWP switching occurs, the power control accumulation status of the old UL BWP(s) may carry-over or reset to the new UL BWP(s) based on how closely related the UL BWPs are. Various factors the UE may consider when determine whether the UL BWPs are closely related are as follows:

In certain embodiments, the CL-PC process is reset upon active UL BWP switching if the old and new UL BWPs are largely separated in frequency. For instance, if a frequency distance between the old and new UL BWPs is larger than a threshold value, then the UE resets the CL-PC process. As used herein, "frequency distance" refers to a distance between the highest frequency of a first BWP in a lower frequency part and the lowest frequency of a second BWP in a higher frequency part. The threshold value may be predetermined or configured at the UE.

Note that under large frequency separation between given two configured BWPs, UE may be equipped with separate power amplifiers and radio frequency ("RF") chains, similar to inter-band CA or intra-band non-contiguous CA operation. Because of the separate PAs and RF chains (and potentially significantly different dynamic interference levels across BWPs), power offset with respect to a desired power level in the new UL BWP may be different from power offset in the old UL BWP. Accordingly, in such scenarios the UE resets the power control adjustment state in the accumulation mode, referred to herein as the "power control accumulation status". Thus, if UE's active UL BWP changes from a first BWP in a NUL carrier of a serving cell to a second BWP in a SUL of the serving cell, then the UE may reset the power control adjustment state due to large frequency separation between the UL carrier and SUL carrier.

Similarly, the accumulation status of the CL-PC process may be carried over upon active UL BWP switching, if the old and new UL BWPs are closely located in frequency. For example, if a frequency distance between the old and new UL BWPs is smaller than a threshold value (which can be predetermined or configured), then the UE carries over the power control adjustment state. With small frequency separation or overlapped bandwidth between two BWPs, the UE is likely to use the same PA and RF chain for both BWPs and interference levels may not be significantly different. Accordingly, the UE can carry over the power control adjustment state from one BWP to another BWP.

In certain embodiments, the UE considers open-loop parameter values (e.g., P0 and α) when deciding whether the new and old active BWPs are closely related. For example, the CL-PC process may be carried over if the same open-loop parameters (P0 and α) values are configured for the corresponding old and new UL BWPs. Otherwise, if different open-loop parameters (P0 and α) values are configured for the corresponding old and new UL BWPs, then the CL-PC process may be reset upon UL BWP switching.

As discussed above, the CL-PC process may be carried over if UL BWP switching is occurring very frequently. Here, "very frequently" may be defined as exceeding a threshold rate, e.g., more than X switches in the last Y radio frames. In one embodiment, the threshold rate is predefined. In another embodiment, the threshold rate is configured by the RAN node. The CL-PC process may be carried over if UL BWP switching is occurring very frequently, so as to avoid abrupt UE transmit power changes and ping-pong effects. If the UL BWP switching rate does not exceed the threshold rate, then the UE is permitted to reset the CL-PC process.

In various embodiments, the UE considers UL carrier properties when deciding whether the new and old active BWPs are closely related. In certain embodiments, the CL-PC process is carried over if the same numerology (subcarrier spacing) and/or service (traffic type, e.g., eMBB or URLLC) are configured for the corresponding old and new UL BWP(s), otherwise the CL-PC process is reset upon UL BWP switching. In certain embodiments, the CL-PC process is carried over if the same modulation and coding scheme (MCS) and/or channel quality indicator (CQI) table(s) and/or target reliability (e.g., block error ratio, "BLER") requirement are configured for both the old and the new UL BWP, otherwise the CL-PC process is reset upon UL BWP switching.

In certain embodiments, the CL-PC process is carried over if the same pathloss references or QCL pathloss references are configured for both the old and the new UL BWP. Here, the pathloss reference in first (e.g., old) BWP may be the same or QCL with pathloss reference in second (e.g., new) BWP. The quasi-co-location may be with respect to a subset of the large-scale properties (such as only spatial RX parameters), otherwise the CL-PC process is reset upon UL BWP switching.

In certain embodiments, the UE considers both pathloss references and open-loop parameter values when deciding whether the new and old active BWPs are closely related. For example, the CL-PC process may be carried over if the same/QCL pathloss reference(s) AND the same open-loop parameters (P0 and α) are configured for both the old and the new UL BWP, otherwise the CL-PC process is reset upon UL BWP switching.

In some embodiments, the UE considers both pathloss references in combination with other properties when deciding whether the new and old active BWPs are closely related. In certain embodiments, the CL-PC process is carried over if the same/QCL pathloss reference(s) AND the same MCS and/or CQI table(s) and/or target reliability (e.g., BLER) requirement are configured for both the old and the new UL BWP, otherwise the CL-PC process is reset upon UL BWP switching. In certain embodiments, the CL-PC process is carried over if the same/QCL pathloss reference(s) AND the same MCS and/or CQI table(s) and/or target reliability (e.g., BLER) requirement AND the same open-loop parameters (P0 and α) are configured for both the old and the new UL BWP, otherwise the CL-PC process is reset upon UL BWP switching.

In some embodiments, MCS table(s) and/or CQI table(s) and/or target reliability requirement(s) (e.g., BLER) are UE-specifically configured for a given serving cell, rather than per BWP of the serving cell. For a given pathloss reference and a given UL physical channel, if the UE is indicated with an MCS table (or code rate table) and/or target reliability different than the previous ones, then the UE resets the power control adjustment state upon receiving indication. The indication can be received via UL grant DCI for grant-based PUSCH, via RRC signaling or corresponding DL assignment DCI for PUCCH, and via RRC signaling for configured-grant based PUSCH. In one example, UL grant DCI and/or DL assignment DCI may include a field to indicate which MCS table associated with a different target reliability is to be used. Alternatively, a different DCI format(s) may be defined to support different target reliabilities.

In certain embodiments, if different modulation and coding scheme (MCS) and/or channel quality indicator (CQI) table(s) and/or target reliability (e.g., BLER) requirement are configured for two BWP (or for two services/logical channels/TTI lengths in the same BWP), the equation used for computing $\Delta_{TF,b,f,c}(i)$ and/or some of the configured parameters used for computing $\Delta_{TF,bf,c}(i)$ (in the power control equation) may be different for the two BWP (or for the two services/logical channels/TTI lengths in the same BWP). In various embodiments, $\Delta_{TF,bf,c}(i)$ may be computed using the below equation when the configured $K_S$ value is non-zero:

$$\Delta_{TF,b,f,c}(i)=10 \log_{10}((2^{BPE \cdot K_S}-1) \cdot \beta_{offset}^{PUSCH}) \qquad \text{Equation 4}$$

In various embodiments, the values for BPRE ("bits per resource element") and $\beta_{offset}^{PUSCH}$ H may be determined for each UL BWP b of each carrier f and serving cell c using 3GPP TS 38.213. In certain embodiments, the value of $K_S$ may be provided by the parameter deltaMCS for each UL BWP b of each carrier f and serving cell c. For example, the $K_S$ value used in $\Delta_{TF,b,f,c(i)}$ may be configured to different non-zero values. In such embodiments, the UE may reset the CL-PC process if the configured parameters used for computing $\Delta_{TF,b,f,c(i)}$ are different for the two BWP. In one embodiment, $\Delta_{TF,b,f,c(i)}=0$ when the configured $K_S$ value is zero. In certain embodiments, if the PUSCH transmission is over more than one transmission layer, then $\Delta_{TF,b,f,c(i)}=0$.

Accordingly, in various embodiments the UE receives a plurality of target reliability configurations. Here, each of the plurality of target reliability configurations includes at least one of: a modulation and coding scheme (MCS) table, a channel quality indicator (CQI) table, and an associated radio network temporary identifier. Additionally, the UE may perform a first uplink transmission of an uplink channel based on a first target reliability configuration and a power control adjustment state of the uplink channel.

In certain embodiments, the UE receives an indication for a second uplink transmission of the uplink channel. Here, the second uplink transmission of the uplink channel may be based on a second target reliability configuration and the power control adjustment state of the uplink channel. The UE determines whether the second target reliability configuration is different than the first target reliability configuration and, in response to the determination that the second target reliability configuration is different than the first target reliability configuration, may reset a power control adjustment state of the uplink channel.

Afterwards, the UE performs the second uplink transmission of the uplink channel based on the second target reliability configuration and the reset power control adjustment state of the uplink channel. In some embodiments, each of the plurality of target reliability configurations further includes an associated downlink control information (DCI) format. In some embodiments, each of the plurality of target reliability configurations further includes a set of power control parameters. In such embodiments, the set of power control parameters may include at least one of a power spectral density per subcarrier spacing and a pathloss compensation parameter.

In certain embodiments, the uplink channel is a physical uplink shared channel (PUSCH). In some embodiments, the UE further receives an indication that the second uplink transmission of the uplink channel is based on the second target reliability configuration via downlink control information.

In a beam-based communication operation such as 5G NR, due to directional antenna beamforming operation, a single pathloss reference and a single CL-PC process (e.g., as used in 4G LTE) is insufficient to capture power characteristics in all directions. Accordingly, in 5G NR Rel 15 the UEs are to support up to 2 CL-PC processes per serving cell, and up to 4 pathloss reference per serving cell. This is a trade-off between minimizing UE complexity and accurate UE transmit power determination. Note that, since both UL carriers (e.g., NUL and SUL carriers) of a serving cell are linked to a single DL carrier, the pathloss reference cannot be distinguished (e.g., differently configured) for the two UL carriers of a serving cell.

With a BWP-specific power control operation, in which open-loop (e.g., a and at least the UE-specific component of P0), pathloss reference, and CL-PC process are configured per UL BWP, the number of required PL references and CL-PC processes may differ in the case that multiple active BWPs are supported. The below solutions clarify whether the number of maintained PL references and/or CL-PC processes are to scale with the number of active UL BWPs.

In some embodiments, the UE is configured with and maintains a total number (e.g., M<=4) of pathloss references for a serving cell, regardless of the number of configured BWPs and/or the number of active BWPs per serving cell. This first solution is beneficial for lower UE complexity, and is not expected to cause significant performance loss, particularly for lower frequency bands such as below 6 GHz.

In some embodiments, a UE is configured with and maintains a number (e.g., M<=4) of pathloss references per configured UL BWP for each UL carrier of a serving cell, so that the UE is configured with and maintains a total number (e.g., 4M<=16) of pathloss references when up to 4 UL BWPs are configured per serving cell, regardless of the number of active UL BWPs. Note that a UE may be configured with different numbers of pathloss references for different BWPs. This second solution significantly increases UE complexity as compared to the first solution. Beneficially, the second solution improves UE transmit power determination accuracy for higher frequency bands, e.g., above 6 GHz, where different BWPs within an UL carrier of a serving cell are expected to be far apart.

In some embodiments, a UE maintains a total number M×N of pathloss references per serving cell, where L≤(M× N)≤4N. Here, N≤4 is the number of active UL BWPs within the UL carrier of the serving cell. The number L may be fixed for all frequency bands or may depend upon the frequency band of the UL carrier of the serving cell. A UE may be configured with different number of pathloss references for different active BWPs. For example, in the case of NR Rel 15, where only one BWP is active within each UL carrier of a serving cell, the UE may maintain up to eight pathloss references serving cell. This third solution may be useful to trade-off UE complexity with accurate UE transmit power determination across different UL BWPs for both low and high frequency bands.

In certain embodiments, the UE is configured with and maintains a set number (e.g., two) of separate/independent CL-PC processes per UL BWP, so e.g., up to eight separate CL-PC processes per UL carrier of a serving cell when up to 4 UL BWPs are configured for the UL carrier of a serving cell, regardless of the number of active UL BWPs. A UE may be configured with different number of CL-PC processes for different BWPs.

In certain embodiments, the UE is configured with and maintains a total number (e.g., two) CL-PC processes per serving cell, shared between all BWPs of both UL carriers, regardless of the number of configured UL BWPs and/or number of active UL BWPs.

In another embodiment, the UE is configured with and maintains a total number 2×N of CL-PC processes shared between all UL BWPs of an UL carrier of a serving cell, where N is the number of active BWPs, so that 2×N CL-PC processes are used as the power adjustment status for active BWPs. A UE may be configured with different number of CL-PC processes for different active BWPs. In one example, if there is only one active BWP (as in the case of NR Rel 15), then only two CL-PC processes are maintained by the UE for each UL carrier of a serving cell.

Figure 4:
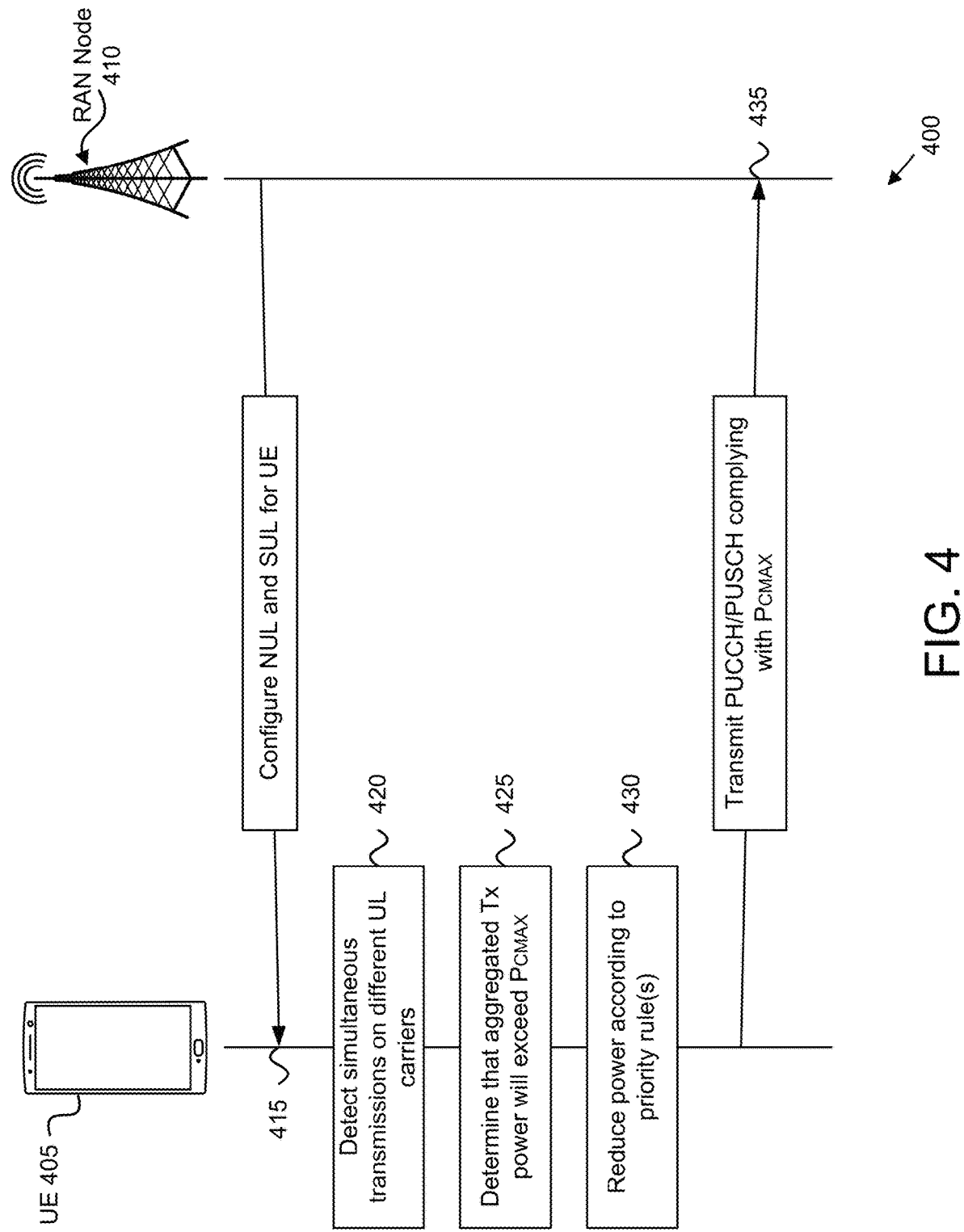
FIG. 4 is a block diagram illustrating another embodiment of power control for a UE configured with multiple uplink carriers.

FIG. 4 depicts a network architecture 400 for UE power control for multiple UL carriers, according to embodiments of the disclosure. The network architecture 400 includes a UE 405 and a RAN Node 410. The UE 405 may be one embodiment of the remote unit 105, described above. The RAN Node 410 (e.g., a gNB) may be one embodiment of the base unit 110, described above.

The RAN Node 410 may configure the UE 405 with a NUL carrier and a SUL carrier (see messaging 415). During operation on NUL and SUL, the UE 405 detects a time where UL transmissions are scheduled on different UL carriers that overlap in time (see block 420). The UE 405 determines that the estimated aggregated transmission power during the overlapping UL transmissions will exceed $P_{CMAX}$ for the UE 405 (see block 425).

In response to the aggregated transmission power exceeding the limit, the UE 405 reduces the power of the future UL transmission according to one or more priority rules, as discussed in further detail below (see block 430). In certain embodiments, the UE 405 reduced power by applying a power downscaling-factor to one or more UL carriers during the overlap period. In certain embodiments, the UE 405 reduced power by dropping UL transmission on one or more UL carriers during the overlap period. Having reduced the UL transmission power to comply with $P_{CMAX}$, the UE 405 transmits PUCCH and/or PUSCH (see messaging 435).

While described with reference to multiple UL carriers (e.g., NUL/SUL operation) on the same serving cell, similar techniques may apply to the UE 405 configured with multiple UL carriers over multiple serving cells (e.g., CA on the UL) and overlapping UL transmissions are scheduled on different UL carriers. Similar principles also apply when the UE 405 is configured with multiple active UL BWPs and overlapping UL transmissions are scheduled on different active UL BWPs.

In some embodiments, in a single-cell (NUL/SUL) or carrier-aggregation operation, overlapping transmissions may overlap in time (e.g., with the same or different starting time instance and/or with the same or different length/duration) on different active UL BWP(s) of different uplink carrier and/or serving cells of the transmissions occur. This situation leads to partial or full overlap between different UL transmissions. If the UE 405 aggregated transmit power across all corresponding uplink carriers and/or serving cells in any symbols/portions/parts of the UL transmissions exceeds the configured maximum UE transmit power, e.g., $P_{CMAX}$, then the UE 405 reduces power or drops transmission on the UL BWPs/carriers/cells according to the following priority rules. Note that a combination of priority rules may also be used, e.g., when priority ranking of the UL BWPs/carriers/cells is not resolved by only one priority rule.

When no simultaneous transmission occurs on both UL and SUL uplink carriers of the same serving cell, then the UE 405 may follow a rule based on the priority of the signals/channels. For example, in case of same priority order and for operation with two UL carriers, the UE 405 prioritizes power allocation for transmissions on the carrier where the UE 405 is configured to transmit PUCCH. However, if PUCCH is not configured for any of the two UL carriers, then the UE 405 prioritizes power allocation for transmissions on the non-supplementary UL carrier.

When simultaneous transmission occurs on both NUL and SUL uplink carriers of one or multiple serving cell(s), then if, upon disregarding the NUL/SUL operation, the two transmissions on the two UL carriers of a serving cell correspond to signals/channels that are at different priority levels (e.g., per priority rule described in 3GPP TS 38.213 Rel-15 Section 7.5), then NUL/SUL operation does not impact/change the priority level, that is, simply follow the priority level based on the signal/channel content, described above.

However, if, upon disregarding the NUL/SUL operation, the two transmissions on the two UL carriers of a serving cell correspond to signals/channels that are the same priority level (e.g., per priority rule described in 3GPP TS 38.213 Rel-15 Section 7.5), e.g., when both are SRS transmissions of the same time-domain periodicity behavior, or e.g., when PUSCH without uplink control information (UCI) is transmitted on one NUL carrier and another PUSCH without UCI is transmitted on another UL carrier (e.g., SUL), then the UE 405 applies one or more of the below the priority rules may resolve the priority ranking of the NUL and SUL carriers:

In certain embodiments, the UL carrier configured for PUCCH transmission has higher priority than the non-PUCCH UL carrier. The NUL/SUL carrier location of PUCCH may be semi-statically configured by higher layers. In certain embodiments, the NUL carrier has always higher priority than the SUL carrier, regardless of the NUL/SUL location configuration for PUCCH.

In the scenario that multiple active UL BWPs per UL carrier of a serving cell is supported, when overlapping transmissions occur on more than one active UL BWP of one/both uplink carrier(s) of one or multiple serving cell(s), then if, upon disregarding the BWP operation, the UL transmissions on the multiple active UL BWPs correspond to signals/channels that are at different priority levels (e.g., per priority rule described in 3GPP TS 38.213 Rel-15 Section 7.5), then BWP operation does not impact/change the priority level. Accordingly, the UE 405 follows the priority level based on the signal/channel content, discussed above.

However, upon disregarding the BWP operation, if the two transmissions on the multiple active UL BWPs correspond to signals/channels that are the same priority level (e.g., per priority rule devised in 3GPP TS 38.213 Rel-15 Section 7.5), e.g., when all active UL BWPs have SRS transmissions of the same time-domain periodicity behavior, or e.g., when one PUSCH without UCI is transmitted on one active UL BWP (e.g., toward one spatial direction) and another PUSCH without UCI is transmitted on anther UL BWP (e.g., toward another spatial direction), then the UE 405 applies one or more of the below the priority rules may resolve the priority ranking of the multiple active BWPs:

In certain embodiments, the active UL BWP that corresponds to higher numerology (e.g., larger subcarrier spacing) has higher priority. In certain embodiments, the active UL BWP that corresponds to a higher-priority service/traffic type (e.g., URLLC) has higher priority over the active UL BWP that corresponds to a lower-priority service/traffic type (e.g., eMBB).

In some embodiments, the active UL BWP that corresponds to a higher-priority MCS and/or CQI table(s) and/or target reliability (e.g., BLER) requirement (e.g., that/those configured for URLLC) has higher priority over an UL BWP that corresponds to a lower-priority MCS and/or CQI table(s) and/or target reliability (e.g., BLER) requirement (e.g., that/those for eMBB).

In certain embodiments, in the case that the active UL BWPs belong to a single serving cell, then the active UL BWP with the lowest BWP Index has highest priority. In the case of active BWP(s) belong to different serving cells, the active BWP(s) on the serving cell with the lowest serving cell index has highest priority. The case of the active UL BWPs belong to a single carrier of a serving cell has been described above.

In some embodiments, the attribute(s) used for priority determination for the multiple active BWPs (such as numerology, service/traffic type priority level, and MCS and/or CQI table(s) and/or target reliability (e.g., BLER) requirement priority level) are the same. In such embodiments, then the UE 405 applies power scaling among those active UL BWP in the same way, except for one or multiple UL transmissions(s) corresponding to one or multiple active UL BWP(s) that are dropped. In other embodiments, power scaling or dropping among those active UL BWP is up to UE implementation.

In certain embodiments, the active UL BWPs belong to a single serving cell, the active UL BWP with the lowest BWP Index has higher priority. In case of active BWP(s) belong to different serving cells, the active BWP(s) on the serving cell with the lowest serving cell index has higher priority.

Figure 5:
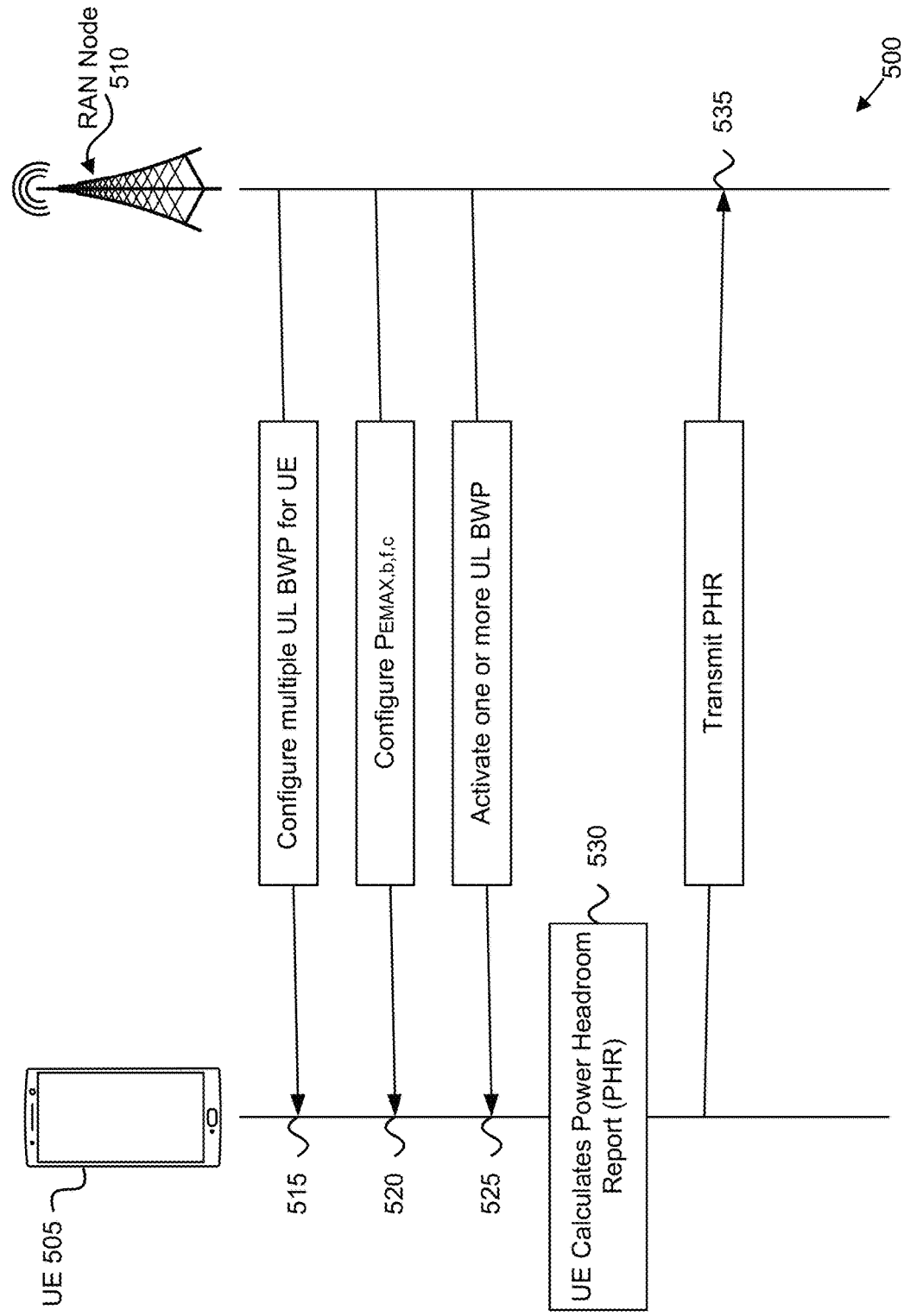
FIG. 5 is a block diagram illustrating one embodiment of power headroom reporting for a UE configured with multiple uplink bandwidth parts.

FIG. 5 depicts a network architecture 500 for UE power control for multiple UL carriers, according to embodiments of the disclosure. The network architecture 500 includes a UE 505 and a RAN Node 510. The UE 505 may be one embodiment of the remote unit 105, described above. The RAN Node 510 (e.g., a gNB) may be one embodiment of the base unit 110, described above.

As depicted, the RAN Node 510 may configure the UE 505 with multiple UL BWP (see messaging 515). As discussed above, the configured maximum UE output power on a serving cell c and UL carrier f may be a function of the UL BWP, that is, $P_{CMAX,b,f,c}$. As depicted, the RAN Node 510 may configure the UE 505 with $P_{CMAX,b,f,c}$ for each configured UL BWP (see messaging 520). Moreover, the RAN Node 510 may activate one or more UL BWP of the UE 505 (see messaging 525). As used herein, the term "active BWP" refers to an BWP where uplink and/or downlink transmissions can take place. Accordingly, the UE 505 may calculate a power headroom level and/or a power headroom level for an active BWP ($PH_b$) (see block 530). The UE 505 transmits one or more PHR to the RAN Node 510 (see messaging 535).

As described above, when the UE 505 is configured with multiple UL BWP for a serving cell and one or more of the configured UL BWPs are active, the UE 505 reports power headroom information for each active UL BWP of a serving cell (see messaging 535). The reported power headroom information may encompass a maximum UE transmit power level $P_{CMAX,b,f,c}$ used for the calculation of the power headroom level and/or a power headroom level for an active BWP ($PH_b$). A power headroom (PH) type (e.g., type 1, or type 3 PH) may also be reported. In certain embodiments, the UE 505 may report multiple PHRs for a serving cell.

In certain embodiments, the UE 505 may compute and report a PHR for an active UL BWP only if that UL BWP is configured with a different pathloss reference, e.g., the DL RS resource for pathloss estimation for the first active UL BWP is not QCL (e.g., at least with respect to spatial Rx parameters) with the DL RS resource for pathloss estimation for the second active UL BWP.

In certain embodiments, when the UE 505 is configured to report multiple PHRs for different active UL BWPs of an UL carrier of a serving cell, the UE 505 reports an absolute PHR for a first active UL BWP in that serving cell and differential PHR(s) for the other UL BWP(s) in that serving cell, where a differential PHR is defined as the relative difference value between the second/target PHR with respect to the first/reference PHR.

A differential PHR can be positive, zero, or negative, where positive differential PHR means higher power headroom (PH) on the second/target active UL BWP compared to the first/reference active UL BWP; and where negative differential PHR means lower PH on the second/target active UL BWP compared to the first/reference active UL BWP, and zero differential PHR means the same PH on the second/target active UL BWP compared to the first/reference active UL BWP. Differential PHR is used to decrease the bit-width used for reporting multiple PHRs.

In certain embodiments, when the UE 505 is configured to report multiple PHRs for different active UL BWPs of an UL carrier of a serving cell, all PHRs corresponding to all active BWPs report absolute values, e.g., no differential PHR is used. In certain embodiments, when the UE 505 is configured to report multiple PHRs for different active UL BWPs of an UL carrier of a serving cell, how to decide whether to report absolute or differential PHR for all active UL BWPs depends on the gNB determination and/or UE setting.

In one example, differential PHR is used only when $P_{CMAX,f,c}$ does not depend on the choice of the BWP, e.g., a single $P_{CMAX,f,c}$ value is used for all BWPs configured on that UL carrier of the serving cell, which can be an information already conveyed by the UE 505 to the gNB. In one example, differential PHR is used only when the same or quasi-co-located pathloss reference (e.g., the same DL RS resource for pathloss estimation) is configured for all UL BWPs configured on that UL carrier of the serving cell. In another example, the UE 505 is semi-statically configured whether to report absolute or differential PHR for different active UL BWPs of an UL carrier of a serving cell.

In certain embodiments, when the UE 505 is configured to report multiple PHRs for different active UL BWPs of an UL carrier of a serving cell, the PH information included is in order from the PH for the lowest active BWP index to PH for the highest active BWP index. For a BWP corresponding to the lowest active BWP index, absolute PH is included. For other BWP, differential PH is included if the pathloss reference for the BWP is same or QCL with a pathloss reference of BWP with smaller BWP index (that that for the other BWP) for which PH is included, otherwise a full PH for the other BWP is included.

In certain embodiments, when the UE 505 is configured to report multiple PHRs for different active UL BWPs of an UL carrier of a serving cell, one or multiple BWP group(s) can be formed, so that each BWP group correspond to the set of all configured UL BWPs that share the same or quasi-co-located pathloss reference and/or the same $P_{CMAX,b,f,c}$ value. According to this embodiment, to report multiple PHRs for multiple active UL BWPs, the UE 505 reports an absolute PHR for a first BWP in each BWP group and reports differential PHR(s) for all other active UL BWP(s) in that BWP group. The first BWP in each BWP group may correspond to the BWP with the lowest BWP index.

In certain embodiments, the UE 505 uses PHR MAC CE format which is identified by a MAC PDU subheader with a reserved Logical channel ID value. The PHR MAC CE may include a bitmap for each active serving cell which indicates in ascending order based on the BWP_index for which of the configured UL BWPs of a serving cell power headroom information is included.

In some embodiments, the configured maximum UE transmit power reported within the PH info for an active bandwidth is a BWP-specific maximum UE transmit power ($P_{CMAX}$,b,f,c,), such that various maximum power reduction terms (e.g., MPR, A-MPR, P-MPR) in the $P_{CMAX,b,f,c}$ formula are defined per UL BWP, as discussed above.

In certain embodiments, the configured maximum UE transmit power ($P_{CMAX}$) may be the same for each configured UL BWP of a UL carrier of a serving cell. Here, $P_{MAX}$ is defined as the maximum UE transmit power for the overall operation on an UL carrier of a serving cell, e.g., maximum power reduction terms such as MPR, A-MPR, P-MPR are calculated for non-contiguous allocations of PRBs or resources/channels (e.g., PUSCH, PUCCH) across different active BWPs. In one embodiment, the UE 505 may only report one configured maximum UE transmit power value $P_{CMAX,f,c}$ per serving cell even though multiple power headroom levels ($PH_{c,b}$) are reported, e.g., one for each active BWP, of the UL carrier.

In certain embodiments, a combined PHR is calculated and/or reported for a serving cell having multiple active UL BWPs. In such embodiments, the combined PHR may be calculated as the difference between the configured UE maximum transmit power of a serving cell and the sum of the estimated powers for a UL (e.g., UL-SCH on PUSCH, PUCCH) transmission over all active UL BWPs of that serving cell. Accordingly, the UE 505 may only report one PH level and one associated $P_{CMAX,f,c}$ field (if reported) per serving cell, similar to the Carrier Aggregation scenario.

In various embodiments, the transmit power control ("TPC") command that is linked to the closed-loop index 'l' is applied to all active UL BWPs that are associated with closed-loop index 'l'. In certain embodiments, a group common TPC command received in a group common DCI (e.g., DCI format 2_2, 2_3) on an active DL BWP includes a BWP index field indicating the UL BWP for which the group common TPC applies. The group common TPC command may be associated with a closed-loop index 'l'.

In certain embodiments, the BWP index field is not present in the group common DCI, and the UL BWP for which the group common TPC applies has the same BWP index as the active DL BWP on which the group common DCI is received, e.g., in the case of TDD. In case there is an explicit linking or implicit linking (e.g., UL BWP and DL BWP with the same BWP index are linked) between a DL BWP and UL BWP, the UL BWP for which the group common TPC applies can be determined based on the linking to the active DL BWP on which the group common DCI is received.

In certain embodiments, in the case of group-common TPC operation, e.g., in DCI format 2_2 and 2_3 in NR, the TPC index together with the CL process index '1' and/or UL BWP index, is semi-statically configured for the UE 505 to determine the location of TPC command in the DCI for the UE 505 and associated CL process index '1' and/or UL BWP index.

In various embodiments, a PHR is triggered at the UE 505 when the number of active UL BWPs for a serving cell is changed. In one example, the RAN Node 510 may activate an additional BWP part in a serving cell, which triggers a PHR in response to the BWP activation.

In some embodiments, a PHR is triggered in the UE 505 when phr-ProhibitTimer expires or has expired and the path loss has changed more than phr-Tx-PowerFactorChange [in dB] for at least one active UL BWP of a serving cell of any MAC entity which is used as a pathloss reference since the last transmission of a PHR in this MAC entity when the MAC entity has UL resources for new transmission.

In some embodiments, PHR triggering based on pathloss change is allowed only for one or more certain UL BWPs (or corresponding pathloss references). According to this embodiment, a BWP-group called allowedPHTriggeringGroup may be configured such that a PHR is triggered only for the UL BWP(s) belonging to this group (e.g., when dl-PathlossChange [in dB] or phr-Tx-PowerFactorChange is exceeded for one of the members). The allowedPHTriggeringGroup BWP-group may be related to certain service/numerology/BWP.

In certain embodiments, the parameter dl-PathlossChange or phr-Tx-PowerFactorChange, which is used for PHR triggering condition based on pathloss change, may be configured differently for different UL BWPs. For example, the parameter dl-PathlossChange or phr-Tx-PowerFactorChange may be based on the corresponding service/numerology associated with the UL BWP. In one embodiment, a larger dl-PathlossChange or phr-Tx-PowerFactorChange value can be configured for a BWP to prevent frequent PHR triggering for that BWP. In a related embodiment, the dl-PathlossChange or phr-Tx-PowerFactorChange value for one or multiple UL BWP(s) can be set to a very large value (e.g., infinity), essentially disabling pathloss-based PHR triggering for that/those UL BWP(s).

Figure 6:
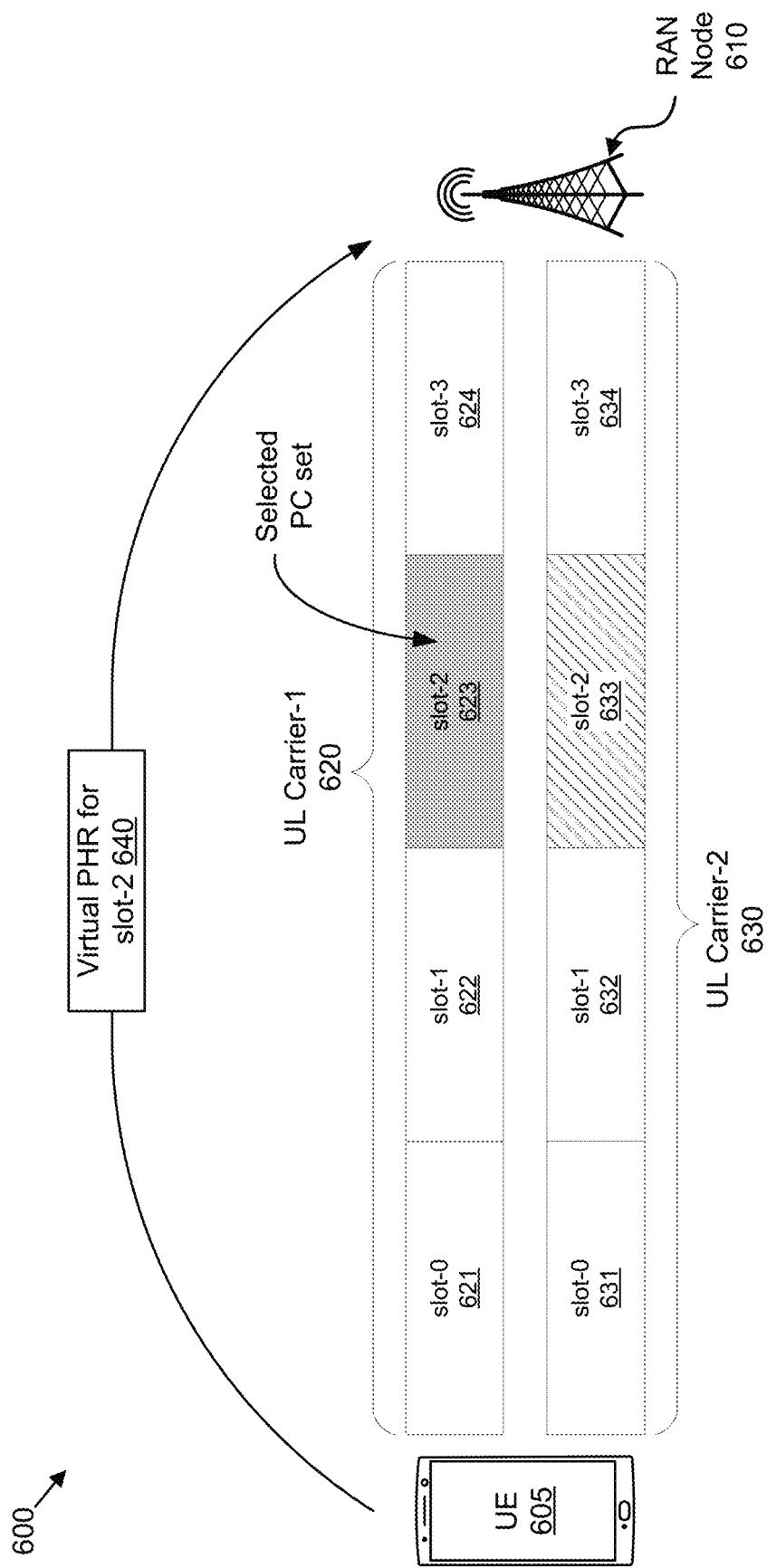
FIG. 6 is a block diagram illustrating one embodiment of power headroom reporting for a UE configured with multiple uplink carriers.

FIG. 6 depicts a network architecture 600 for UE power control for multiple UL carriers, according to embodiments of the disclosure. The network architecture 600 includes a UE 605 and a RAN Node 610. The UE 605 may be one embodiment of the remote unit 105, described above. The RAN Node 610 (e.g., a gNB) may be one embodiment of the base unit 110, described above.

In the network architecture 600, the UE 605 is configured with a first UL carrier 620 (i.e., UL Carrier-1) and a second UL carrier 630 (i.e., UL Carrier-2). The UL carriers 620 630 have multiple slots. As depicted, the first UL carrier 620 has a first slot (slot-0) 621, a second slot (slot-1) 622, a third slot (slot-2) 623, and a fourth slot (slot-3) 624. Similarly, the second UL carrier 630 has a first slot (slot-0) 631, a second slot (slot-1) 632, a third slot (slot-2) 633, and a fourth slot (slot-3) 634.

The UE 605 reports a PHR for, e.g., slot-2. In various embodiments, the UE 605 reports a virtual PHR 640. Described below are various solutions for selecting which PC parameter set (e.g., associated with the first UL carrier 620 or the second UL carrier 630) is to be used when calculating the virtual PHR 640. In the depicted example, the PC parameter set of the first carrier 620 is selected, however in other embodiments the PC parameter set of the second carrier 630 may be selected.

Note that the term "virtual" in connection with the terms "virtual power headroom" and "virtual PHR" refers to their non-standard character. The "virtual power headroom" is virtual in the sense that the power headroom does not reflect the difference between the maximum transmit power of the component carrier and a real uplink transmission performed on a non-scheduled uplink component carrier (i.e., the standard character of a PH), but merely assumes a reference uplink transmission which actually does not take place.

When the UE 605 is configured with two UL carriers for a serving cell (e.g., NUL/SUL operation) and the UE 605 determines a Type 1 power headroom report for the serving cell based on a reference PUSCH transmission, then the UE 605 computes a Type 1 power headroom report for the serving cell assuming a reference PUSCH transmission on the UL carrier, e.g., provided by parameter pusch-Config. If the UE 605 is provided with pusch-Config for both UL carriers, then the UE 605 computes a Type 1 power headroom report for the serving cell assuming a reference PUSCH transmission on the UL carrier provided by parameter pucch-Config. However, if pucch-Config is not provided to the UE 605 for any of the two UL carriers, then the UE 605 computes a Type 1 power headroom report for the serving cell assuming a reference PUSCH transmission on the normal, non-supplementary UL carrier.

In CA operation, PUSCH PHR can become virtual for a serving cell if that cell is not scheduled with PUSCH at the time PHR is prepared. Since multiple PC parameter sets (e.g., open-loop, pathloss reference, and closed-loop configurations) are possible for the UE power control, a reference PC parameter set is necessary for virtual PUSCH PHR. The reference PC parameter used for virtual PUSCH PHR can be semi-statically selected and configured by the network, or it can be a default/fixed setting in the UE specification. In either case, since PC parameter sets can be configured per UL BWP and UL carrier, it is important for the RAN Node 610 to configure/specify which UL carrier and which UL BWP the configured/default PC parameter set for virtual PUSCH PHR corresponds to.

Regarding the default setting, the following may be considered:

In certain embodiments, if PUSCH and PUCCH transmission for a serving cell are semi-statically configured to be the same UL carrier, then the default PC parameter set that is used for virtual PUSCH PHR is a PC parameter set corresponding that UL carrier.

In certain embodiments, if the PHR format in MAC CE allows only one PHR per serving cell, then the default PC parameter set that is used for virtual PUSCH PHR may be the PC parameter set corresponding to the UL carrier configured for PUCCH transmission. Note that the NUL/SUL carrier location of PUCCH may be semi-statically configured by higher layers. In certain embodiments, the PC parameter set that is used for virtual PUSCH PHR is always a PC parameter set corresponding to the normal UL (NUL) carrier.

In certain embodiments, if the PHR format in MAC CE allows two PHR per serving cell, i.e., one for each NUL and SUL carrier of a serving cell, then for virtual PUSCH PHR the UE 605 uses default PC parameter set as follows: one PC parameter set corresponding to the UL carrier, and one PC parameter set corresponding to the SUL carrier. Here, PUSCH transmission may occur on either or both of the NUL and SUL carriers. In case PUSCH transmission can only occur on one of the NUL or SUL carrier, then the default PC parameter set that is used for virtual PUSCH PHR corresponds to the carrier configured with PUSCH. Similar behavior as described above can also be applied for virtual PUCCH PHR or virtual SRS PHR to determine the default PC parameter set.

In various embodiments, the default PC parameter set that is used for virtual PUSCH PHR is based on the UL BWP. In a first example, for virtual PUSCH PHR the UE 605 uses a PC parameter set corresponding to the initial UL BWP within the UL carrier of the serving cell. For example, the initial UL BWP may be the UL BWP configured for the random-access procedure.

In a second example, for virtual PUSCH PHR the UE 605 uses a PC parameter set corresponding to a default UL BWP within the UL carrier of the serving cell. Note that the default BWP is either the initial UL BWP or another semi-statically configured UL BWP. Here, the default UL BWP refers to an UL BWP linked to a default DL BWP, where the UE 605 switches to the default DL BWP upon expiration of the BWP inactivity timer in a given active DL BWP. In certain embodiments, there may be an explicit linking or implicit linking (e.g., UL BWP and DL BWP with the same BWP index are linked) between a DL BWP and UL BWP.

In a third example, for virtual PUSCH PHR the UE 605 uses a PC parameter set corresponding to the most recent active UL BWP. This option is beneficial since it is based on previous actual transmission, but it is problematic in the case of a missed grant, which can cause confusion between the RAN Node 610 and the UE 605 regarding which UL BWP has been the most recent active UL BWP.

In a fourth example, for virtual PUSCH PHR the UE 605 uses a PC parameter set corresponding to BWP within the UL carrier of a serving cell with a predefined bandwidth part index ("BWP_index"), e.g., a BWP with BWP_index=0.

In a fifth example, for virtual PUSCH PHR the UE 605 uses a PC parameter set corresponding to the configured UL BWP associated with the smallest numerology (e.g., smallest subcarrier spacing). If multiple UL BWPs are configured with the smallest numerology, then the UE 605 may select the UL BWP with the smallest BWP_index.

In a sixth example, for virtual PUSCH PHR the UE 605 uses a PC parameter set corresponding to the configured UL BWP associated with a default configured MCS/CQI table and/or configured target-BLER (e.g., that/those for URLLC). If multiple UL BWPs are associated with the default configured MCS/CQI table and/or configured target-BLER, then the UE 605 selects the one with smallest BWP_index.

In various embodiments, regardless of whether the PUSCH Msg3 is transmitted for initial access or other purposes (such as radio link re-establishment after RLF, handover, UL synchronization, SR transmission), the DL RS for pathloss estimation follows the SS/PBCH block identified by the UE 605 during the current random access procedure, e.g., the SSB used for transmission of Msg1 on PRACH. Note that the SS/PBCH block identified by the UE 605 during the current random access procedure can be quite different from the SS/PBCH block identified by the UE 605 during the initial random access procedure.

Furthermore, as long as the UE 605 has not received dedicated RRC configuration for pathloss estimation for PUSCH/PUCCH, then the UE 605 is to continue to use SS/PBCH block identified by the UE 605 during the most recent random access procedure as the DL RS for pathloss estimation for PUSCH/PUCCH. In one example, for all PUCCH transmissions without explicit beam indication (e.g., with default/fallback spatial relation), the CL-PC index is to be fixed to l=0. Here, for PUCCH without high layer parameter PUCCH-Spatial-relation-info, the closed loop index 1 should also be set to a fixed value, i.e., l=0.

In one embodiment, for PUSCH Msg3 for a UE in RRC_CONNECTED state, if the UE 605 is configured with more than one closed-loop process for PUSCH, the CL-PC index is to be fixed to l=0. Here, for PUSCH Msg3 and the UE 605 in RRC_CONNECTED state, the CL-PC index may be fixed to l=0 if the UE 605 is not configured with twoPUSCH-PC-AdjustmentStates or if the PUSCH transmission is scheduled by a RAR UL grant.

In one embodiment, for the reset of PUSCH/PUCCH closed-loop accumulation, in the case that more than one closed-loop process is configured for PUSCH/PUCCH, if the closed-loop process is reset upon receiving a random access response ("RAR") message, then the CL accumulation of process l=0 is to be reset. Here, if the UE 605 receives a RAR message in response to a PRACH transmission on active UL BWP b of carrier f of serving cell c, then the CL accumulation of process l=0 is to be reset.

Moreover, combination of the above may be used for PC and PHR related configuration and operation methods for BWP and SUL operation.

Figure 7:
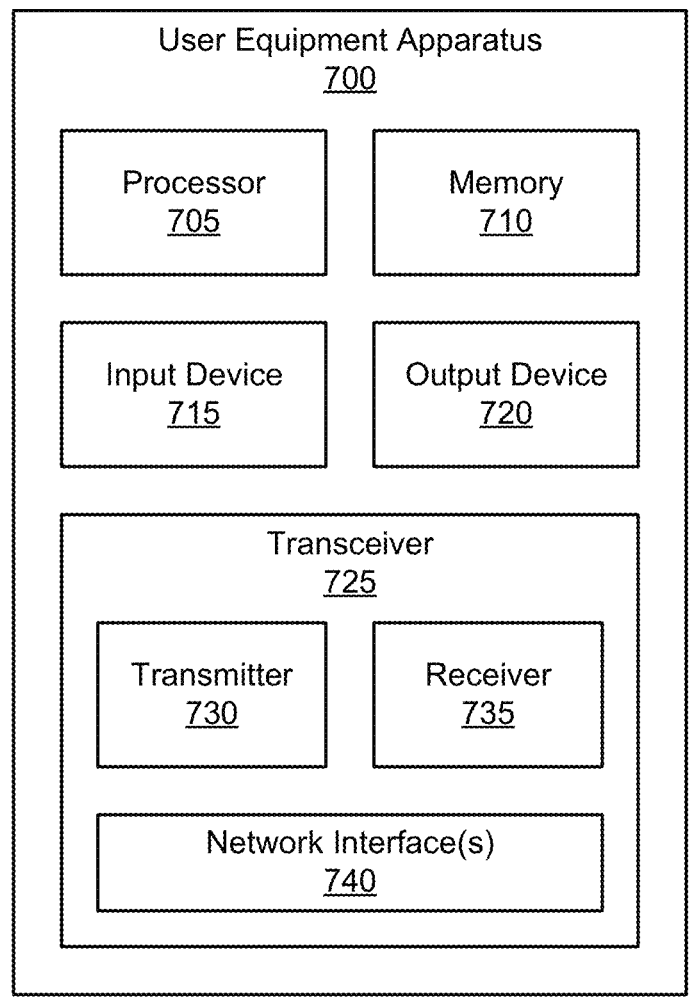
FIG. 7 is a block diagram illustrating a user equipment apparatus for power control BWP when configured with multiple bandwidth parts and/or supplementary uplink carrier.

FIG. 7 depicts a user equipment apparatus 700 that may be used for UE power control for multiple UL carriers, according to embodiments of the disclosure. The user equipment apparatus 700 may be one embodiment of the remote unit 105, described above. Furthermore, the user equipment apparatus 700 may include a processor 705, a memory 710, an input device 715, an output device 720, a transceiver 725 for communicating with one or more base units 110.

As depicted, the transceiver 725 may include a transmitter 730 and a receiver 735. The transceiver 725 may also support one or more network interfaces 740, such as the Uu interface used to communicate with a gNB, or another suitable interface for communicating with the RAN 120. In various embodiments, the transceiver 725 receives configuration of a plurality of uplink carriers for a serving cell. In some embodiments, the transceiver 725 receives configuration of a first number of uplink carriers of the plurality of uplink carriers, the first number of uplink carriers corresponding to a first number of configured and active uplink bandwidth parts of a first uplink carrier of the serving cell.

In some embodiments, the input device 715 and the output device 720 are combined into a single device, such as a touchscreen. In certain embodiments, the user equipment apparatus 700 may not include any input device 715 and/or output device 720.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 calculates a total transmit power for UL transmissions on the plurality of UL carriers, the UL transmissions overlapping in time. The processor 705 may further determine a configured maximum output power and identifies a lower priority UL carrier of the plurality of UL carriers according to a priority rule in response to the UL transmissions having the same priority level. In response to the total transmit power exceeding the configured maximum output power in any part of the overlapping UL transmissions, the processor 705 calculates a reduced transmission power for the lower priority UL carrier in response.

The transceiver 725 performs UL transmission using the reduced transmission power. Specifically, the processor 705 may reduce the transmission power by applying a power down-scaling factor to the lower priority UL carrier and/or dropping an UL transmission of the lower priority UL carrier. Thus, in certain embodiments, performing UL transmission using the reduced transmission power includes dropping transmission for the lower priority UL carrier. In certain embodiments, the processor 705 reduces the transmission power by applying a same power down-scaling factor to UL carriers that are associated with the same priority level.

In some embodiments, the processor 705 identifies the lower priority UL carrier by determining whether a PUCCH is configured for any of the plurality of UL carriers and prioritizing power allocation for an UL carrier configured with PUCCH over an UL carrier not configured with PUCCH.

In some embodiments, the processor 705 identifies the lower priority UL carrier by one or more of: identifying a numerology of each of the plurality of UL carriers, identifying a service type or traffic type associated with each of the plurality of UL carriers, identifying—for each of the plurality of UL carriers—one or more of: a modulation and coding scheme table, a channel quality indicator table, and a target reliability requirement, and identifying an index associated with each of the plurality of UL carriers.

In some embodiments, the plurality of UL carriers includes a SUL carrier and a NUL carrier. Here, the processor 705 may identify the lower priority UL carrier by prioritizing power allocation for the NUL carrier over the SUL carrier. As noted above, receiving the configuration of the plurality of UL carriers for a serving cell may include receiving configuration of a first number of uplink carriers of the plurality of uplink carriers, the first number of uplink carriers corresponding to a first number of configured and active uplink bandwidth parts of a first UL carrier of the serving cell.

In some embodiments, the transceiver 725 receives a configuration of a first number of uplink carriers of the plurality of uplink carriers, the first number of uplink carriers corresponding to a first number of active bandwidth parts of the serving cell, and the processor 705 identifies the lower priority uplink carrier by identifying a lower priority active uplink BWP from the first number of active uplink bandwidth parts according to one or more of: identifying a numerology of each of the first number of active uplink bandwidth parts; identifying a service type or traffic type associated with each of the first number of active uplink bandwidth parts; identifying—for each of the first number of active uplink bandwidth parts—one or more of: a modulation and coding scheme table, a channel quality indicator table, and a target reliability requirement; and identifying an index associated with each of the first number of active uplink bandwidth parts.

In various embodiments, the processor 705 calculates a PH for each UL carrier of the plurality of UL carriers on the serving cell. The processor 705 may then control the transceiver 725 to transmit a PHR based on the calculated PH for the plurality of UL carriers of the serving cell.

In some embodiments, the processor 705 determines a configured maximum output power for the UL carrier from the plurality of UL carriers of the serving cell. In such embodiments, the PH for an UL carrier from the plurality of UL carriers on the serving cell indicates a difference between the configured maximum output power for the UL carrier and a determined transmit power required for an UL transmission on the UL carrier.

In some embodiments, the processor 705 determines a default power control parameter set for the serving cell. In such embodiments, the PHR may include a single PH. In one embodiment, the PHR also includes a corresponding configured maximum output power. Further, the processor 705 may calculate the PH by calculating a virtual PH in response to no UL transmission being present in a reporting period on any UL carrier from the plurality of UL carriers of the serving cell at a time when the PHR is prepared. Here, the virtual PH may be based on the default power control parameter set.

In certain embodiments, the default parameter control parameter set includes one or more of: an open-loop parameter set (or set index), a closed-loop process (or process index), and a pathloss RS (or RS index). In certain embodiments, the default power control parameter set corresponds to an UL carrier on which PUCCH is semi-statically configured.

In some embodiments, only a first UL carrier of the plurality of UL carriers is semi-statically configured for PUSCH, wherein the default power control parameter set corresponds to the first UL carrier. In some embodiments, the default power control parameter set corresponds to an UL carrier with CIF index zero. In some embodiments, the plurality of UL carriers includes a SUL carrier and a NUL carrier, wherein the default power control parameter set corresponds to the NUL carrier.

In various embodiments, the PHR corresponds to one or more of: a PUSCH PHR, a PUCCH PHR, and an SRS PHR.

In some embodiments, the transceiver 725 receives configuration of a first number of uplink carriers of the plurality of uplink carriers, the first number of uplink carriers corresponds to a first number of configured and active uplink bandwidth parts of the serving cell. In such embodiments, the processor 705 may determine a default power control parameter set for the serving cell. Here, the PHR comprises a single PH. Moreover, the processor 705 may calculate the PH by calculating a virtual PH in response to no UL transmission on any active BWP from the first number of active uplink bandwidth parts of the serving cell at a time when the PHR is prepared, wherein the virtual PH is based on the default power control parameter set.

In certain embodiments, the default power control parameter set corresponds to one of: the active UL BWP, an initial UL BWP, and a default UL BWP, wherein the default UL BWP is an UL BWP linked to a default DL BWP. In certain embodiments, the default power control parameter set corresponds to one of: a UL BWP having a smallest BWP index, an UL BWP having a smallest numerology, an UL BWP associated with a service type or traffic type, and an UL BWP associated with a modulation and coding scheme table, an UL BWP associated with a channel quality indicator table, an UL BWP associated with a target reliability requirement, or combination thereof.

In some embodiments, the PHR comprises a plurality of PH fields, wherein a PH field comprises one or more of a PH, a configured maximum output power, and an UL BWP index. In certain embodiments, the configured maximum output power for the UL BWP may be determined based on power reduction factors, wherein power reduction factors for a first UL BWP are different from power reduction factors for a second UL BWP, wherein the first UL BWP and the second UL BWP are different.

In certain embodiments, the configured maximum output power for the UL BWP may be determined based on power reduction factors, wherein power reduction factors for a first UL BWP are the same as power reduction factors for a second UL BWP, wherein the first UL BWP and the second UL BWP are different. In certain embodiments, the configured maximum output power for the UL BWP may be determined based on a maximum allowed UE output power ("$P_{EMAX}$"), wherein a first UL BWP has a first $P_{EMAX}$ and a second UL BWP has a second $P_{EMAX}$, wherein the first $P_{EMAX}$ is a different value than the second $P_{EMAX}$ and the first UL BWP and the second UL BWP are different.

In certain embodiments, the PHR comprises a first PH for a first active UL BWP and a second PH for a second active UL BWP, in response to the first active UL BWP and the second active UL BWP having different configured maximum output power, wherein the first active UL BWP is different from the second active UL BWP.

In certain embodiments, the PHR comprises a first PH for a first active UL BWP and a second PH for a second active UL BWP, in response to the first active UL BWP and the second active UL BWP being associated with one or more of: different configured maximum output power, different pathloss references, and non-Quasi Co-Located pathloss references, wherein the first active UL BWP is different from the second active UL BWP.

In some embodiments, the processor 705 calculates a differential PH, the differential PH being a difference between a PH for a second active UL BWP and a PH for a first active UL BWP, wherein the first active UL BWP is different from the second active UL BWP. In such embodiments, the PHR may include the PH for the first active UL BWP and the differential PH for the second active UL BWP, in response to the first active UL BWP and the second active UL BWP having one of: the same configured maximum output power, the same pathloss references, and quasi-co-located pathloss references.

In certain embodiments, the PHR includes a PH for a first active UL BWP and a second active UL BWP in response to the first active UL BWP and the second active UL BWP having the same configured maximum output power, the same pathloss references, or quasi-co-located pathloss references. Here, the first active UL BWP is different from the second active UL BWP. In such embodiments, the PH is calculated with respect to the first UL BWP.

In certain embodiments, the PHR includes a PH for a first active UL BWP and a second active UL BWP. Here, the PH may be calculated as a difference between the configured UE maximum transmit power of a serving cell and a sum of transmit powers for uplink transmissions on the first active UL BWP and the second UL BWP. In such embodiments, the transmit powers for uplink transmissions may include a first transmit power with respect to a first uplink transmission on the first active UL BWP and a second transmit power with respect to a second uplink transmission on the second active UL BWP.

In some embodiments, the transceiver 725 receives a configuration for a power headroom BWP-group. In one embodiment, receiving the configuration for PH BWP-group includes receiving an 'allowedPHTriggeringGroup' parameter. Here, the processor 705 detects that a MAC entity has UL resources for new transmission and determines whether a PHR backoff timer is expired (e.g., phr-ProhibitTimer).

In such embodiments, the processor 705 may trigger a PHR in response to expiration of the PHR backoff timer and in response to a path loss having changed more than a threshold amount for at least one active BWP belonging to the PH BWP-group of a serving cell (e.g., of any MAC entity which is used as a pathloss reference) since a last transmission of a PHR in the MAC entity. In certain embodiments, the threshold amount is indicated by the parameter 'phr-Tx-PowerFactorChange.'

In some embodiments, the transceiver 725 receives a BWP-specific configuration for a pathloss-change-threshold parameter (e.g., 'dl-PathlossChange' parameter). Here, the processor 705 detects that a MAC entity has UL resources for new transmission and determines whether a PHR backoff timer is expired (e.g., phr-ProhibitTimer).

In such embodiments, the processor 705 may trigger a PHR in response to expiration of the PHR backoff timer and in response to a path loss having changed more than a threshold amount for at least one active UL BWP of a serving cell (e.g., of any MAC entity which is used as a pathloss reference) since a last transmission of a PHR in the MAC entity. Here the threshold amount is configured for the at least one active UL BWP. In certain embodiments, the threshold amount is indicated by the parameter 'dl-PathlossChange.' In other embodiments, the threshold amount may be indicated by the parameter 'phr-Tx-PowerFactorChange.'

In some embodiments, the processor 705 communicates on a first active UL BWP in a serving cell configured with a plurality of UL BWPs and the processor 705 switches from the first active UL BWP to a second active UL BWP. Here, the first active UL BWP and second active UL BWP share a CL-PC process. Moreover, the processor 705 selectively resetting the CL-PC process in response to switching BWPs.

In certain embodiments, selectively resetting the CL-PC process includes resetting the CL-PC process in response to a frequency distance between the first BWP and the second BWP being larger than a threshold value and carrying-over the CL-PC process in response to the frequency distance not being larger than the threshold value.

In certain embodiments, selectively resetting the CL-PC process includes determining a pathloss reference for the first and second BWPs. The processor 705 carries-over the CL-PC process in response to the pathloss references being the same values or having a quasi-co-location relationship for the first and second BWPs and resets the CL-PC process in response to the pathloss references not being the same values and not having a quasi-co-location relationship for the first and second BWPs.

In certain embodiments, selectively resetting the CL-PC process includes determining a set of quality parameters for the first and second BWPs, the set of quality parameters including: a set of open-loop power control parameters, a (e.g., configured) modulation and coding scheme table, a (e.g., configured) channel quality indicator table, a (e.g., configured) target reliability requirement, an associated service type or traffic type, and an associated numerology. Here, the processor 705 resets the CL-PC process in response to the set of quality parameters not being the same values for the first and second BWPs.

In various embodiments, the processor 705 controls the transceiver 725 to perform a random-access procedure. Here, performing the random-access procedure includes transmitting a PUSCH Msg3. The PUSCH Msg3 may be a third message of the random-access procedure. The processor 705 determines whether the user equipment apparatus 700 is in RRC_CONNECTED state and identifies a number of configured CL-PC process for an UL channel or signal. The processor 705 calculates the transmit power for the PUSCH Msg3 using a CL-PC process with index zero in response to the user equipment apparatus 700 being in RRC_CONNECTED state and the number of configured CL-PC processes for the UL channel or signal being more than one.

In some embodiments, the processor 705 determines whether a PUCCH transmission lacks an explicit beam indication and calculates the transmit power for the PUSCH Msg3 using a CL-PC process with index zero in response to the PUCCH transmission lacking an explicit beam indication. In some embodiments, the transceiver 725 receives a RAR when performing the random-access procedure and the processor 705 resets a CL-PC accumulation for a CL-PC process with index zero in response to receiving the RAR. In various embodiments, the PUSCH Msg3 is sent in response to receiving a RAR (also referred to as Msg2) during the random-access procedure.

In some embodiments, the processor 705 determines power control parameters based on one or a plurality of active uplink bandwidth parts (UL BWPs) of an UL carrier f of a serving cell c. The processor 705 also determines a configured maximum output power for the active UL BWPs of UL carrier f of serving cell c and determines at least one transmit power value based on the power control parameters and the configured maximum output power. In various embodiments, the processor 705 controls the transceiver 725 to perform uplink transmission on one or a plurality of active UL BWPs using the determined transmit power value(s).

In certain embodiments, the configured maximum output power $P_{CMAX,b,f,c}$ on UL BWP b of UL carrier f of serving cell c is dependent upon power reduction terms (including MPR, A-MPR, P-MPR, $\Delta T_C$) that depend upon the UL BWP. In certain embodiments, configured maximum output power $P_{CMAX,f,c}$ on UL BWP b of UL carrier f of serving cell c is dependent upon power reduction terms (including MPR, A-MPR, P-MPR, $\Delta T_C$) that are calculated across all configured UL BWPs of the UL carrier f of the serving cell.

In certain embodiments, the configured maximum output power $P_{CMAX,b,f,c}$ on UL BWP b of UL carrier f of serving cell c is dependent upon a maximum allowed UE output power ($P_{EMAX}$) that is configured per UL BWP, that is, $P_{EMAX,b,f,c}$.

In some embodiments, the power control parameters include one or more of open-loop parameters (such as Po, α) (indicated by the index j), TPC closed-loop process index (l), pathloss reference signal ("RS") index (q). In such embodiments, the number of distinct pathloss RSs that the UE maintains may be dependent upon at least one of: the number of configured UL BWPs, the frequency band of the configured UL BWPs, and the number of active UL BWPs. Moreover, the number of distinct TPC closed loop processes that the UE maintains may depend upon at least one of: the number of configured UL BWPs, the numerology associated with the configured UL BWPs, and the number of active UL BWPs.

In various embodiments, a TPC closed-loop process is shared among multiple configured UL BWPs. In such embodiments, the processor 705 may further compare the frequency location and the distance/separation between a first UL BWP and a second UL BWP, compare the open-loop power control parameters (P0 and alpha) associated with the first UL BWP and the second UL BWP, compare the spatial quasi-co-location (QCL) relationship between pathloss reference signals associated with the first UL BWP and the second UL BWP, compare the numerology (subcarrier spacing in OFDM operation) and service (traffic type) associated with the first UL BWP and the second UL BWP, compare the configured MCS table and/or CQI table and/or target reliability (indicated by BLER requirement) associated with the first UL BWP and the second UL BWP, and determine, based upon at least one of these comparisons, whether to reset or carryover the accumulated TPC closed-loop process that is shared the first UL BWP and the second UL BWP when the active UL BWP switches from the first UL BWP to the second UL BWP.

In some embodiments, the processor 705 calculates the total transmit power across of all uplink transmission on all active UL BPWs of all uplink carriers of all active serving cells that overlap in time and determines a power downscaling factor or deciding upon dropping transmission according to a priority rule if the total transmit power in any part of the overlapping transmissions exceed the configured maximum output power. Here, the priority rule for power scaling and transmission dropping, when the signals/channels across different active UL BWPs have the same priority level, is dependent upon at least one of: the numerology (subcarrier spacing in OFDM operation) and service (traffic type) associated with the active BWPs, the configured MCS table and/or CQI table and/or target reliability (indicated by BLER requirement) associated with the active UL BWPs.

Moreover, the same power scaling may be applied to a set of overlapping uplink transmissions on a set of active UL BWPs that are associated with the same numerology, service, and configured MCS/CQI table and target reliability, and contain signals/channels of the same priority level, except perhaps for some uplink transmissions in the set that are dropped. Here, the priority rule for power scaling and transmission dropping, when the signals/channels across a first UL carrier and a second UL carrier have the same priority level, is such that the UL carrier on which PUCCH is semi-statically configured has higher priority that the other UL carrier In various embodiments, the processor 705 reports a Power Headroom Report (PHR) for the UL transmissions on the active UL BWPs of a serving cell. Here, the PHR may include a PH (difference between the configured maximum output power and the determined transmit power required for the UL transmission) and the configured maximum output power [$P_{CMAX,b,f,c}$(i)] for the active UL BWPs. In one such embodiment, a separate PHR may reported for each active UL BWP. In another such embodiment, a PHR may not be reported for a second active UL BWP which is associated with the same pathloss RS or a spatially-QCL pathloss RS that a first UL BWP is also associated with, and a PHR is reported for the first active BWP.

Moreover, the processor 705 may report an absolute PH for a first active UL BWP and reporting differential PH for a second active UL BWP(s), the absolute PH being is the difference between the configured maximum output power and the determined transmit power required for the first active UL BWP transmission and the differential PH is the difference between the PH for the second active UL BWP and the PH for the first UL BWP. Here, reporting the differential PHR may be enabled and disabled by the network entity based on higher layer signaling or signaling received in a DCI.

Still further, the processor 705 may form a BWP group as a set of active UL BWPs and report an absolute PH for a first active UL BWP in the BWP group and differential PH for all other active UL BWP(s) in the BWP group. In such embodiments, a BWP group may be the entire set, or a strict subset of all active UL BWPs on a serving cell. In further embodiments, a BWP group may be a set of all active UL BWPs that share the same configured maximum output power $[P_{CMAX,b,f,c}]$, or a set of all active UL BWPs that share the same pathloss RS or different but spatially-QCL pathloss RSs In various of the above embodiments, the processor 705 may determine a default power control parameter set for a serving cell, calculate (and report) a PHR when no UL transmission is present on the serving cell (e.g., report a virtual PHR). In various embodiments, the default power control parameter set may correspond to: an initial UL BWP which is configured for random access procedure; a default UL BWP which is linked to the default DL BWP; a most recent active UL BWP; an UL BWP with BWP-index equal to 0; an UL BWP with the smallest BWP-index that is associated with the smallest numerology (e.g., subcarrier spacing in OFDM operation); an UL BWP with the smallest BWP-index that is associated with a default configured MCS/CSI table and/or target reliability requirement; a UL carrier on which PUCCH is semi-statically configured; or an UL carrier with CIF (Carrier Indicator Field) index zero.

In some embodiments, the user equipment apparatus 700 is configured with at least one uplink bandwidth part for a serving cell. In such embodiments, the processor 705 may report power headroom information by determining at the mobile terminal power headroom information for each of the at least one configured and active uplink bandwidth part. Here, the power headroom information may include a power headroom level for an uplink bandwidth part and a configured maximum transmit power used for the calculation of the power headroom level, including the power headroom information for each of the configured and active uplink bandwidth part of a serving cell. The processor 705 prepares the power headroom information within a signaling message and controls the transceiver 725 to transmit the signaling message to a network node.

In certain embodiments, the signaling message is transmitted using Medium Access Control ("MAC") control signaling. In further embodiments, the power headroom information includes a bitmap indicating which of the configured uplink bandwidth parts of a serving cell power headroom information is included. In certain embodiments, the configured maximum UE transmit power for an uplink bandwidth part of a serving cell is determined by considering power reduction factors which are defined for an uplink bandwidth part.

In some embodiments, the power headroom information includes a power headroom level and a configured maximum transmit power used for the calculation of the power headroom level. In such embodiments, the processor 705 may include the power headroom information for each of the configured and active uplink bandwidth part of a serving cell in a signaling message and transmit the control signaling message to a network node. In certain embodiments, the power headroom level for a serving cell is calculated as the difference between the configured UE maximum transmit power of a serving cell and the sum of the estimated powers for uplink transmissions on the at least one configured uplink bandwidth part of that serving cell.

In various embodiments, the processor 705 receives a configuration (e.g., allowedPHTriggeringGroup) for a BWP-group and triggers PHR if phr-ProhibitTimer expires or has expired and if the path loss has changed more than a threshold amount (e.g., indicated by parameter phr-Tx-PowerFactorChange) for at least one active BWP belonging to the (allowedPHTriggeringGroup) BWP-group of a serving cell of any MAC entity which is used as a pathloss reference since the last transmission of a PHR in this MAC entity when the MAC entity has UL resources for new transmission.

In various embodiments, the processor 705 receives a configuration for a pathloss-change-threshold parameter (e.g., dl-PathlossChange and/or) and triggers PHR if phr-ProhibitTimer expires or has expired and the path loss has changed more than a threshold among (e.g., indicated by the parameter dl-PathlossChange or the parameter phr-Tx-PowerFactorChange) for at least one active UL BWP of a serving cell of any MAC entity which is used as a pathloss reference since the last transmission of a PHR in this MAC entity when the MAC entity has UL resources for new transmission. Here, the threshold amount (e.g., dl-PathlossChange and/or phr-Tx-PowerFactorChange) is configured for the at least one UL BWP.

In various embodiments, the processor 705 receives a UE-specific configuration of one or a plurality of MCS table(s) and/or CQI table(s) and/or target reliability requirement(s). In such embodiments, the processor 705 performs a first uplink transmission corresponding to: a signal/channel, a first MCS table and/or CQI table and/or target reliability requirement, a first transmit power associated with a pathless reference and a closed-loop process index. Moreover, the processor 705 may receive an indication for a second MCS table and/or CQI table and/or target reliability requirement, different from the first MCS table and/or CQI table and/or target reliability requirement and reset the closed-loop process associated with that that closed-loop process index. Additionally, the processor 705 may control the transceiver 725 to perform a second uplink transmission corresponding to: the same signal/channel, the second MCS table and/or CQI table and/or target reliability requirement, a second transmit power associated with the same pathless reference and the same closed-loop process index.

In certain embodiments, the indication for MCS table(s) and/or CQI table(s) and/or target reliability requirement can be received via UL grant DCI for grant-based PUSCH, via RRC signaling or corresponding DL assignment DCI for PUCCH, and via RRC signaling for configured-grant based PUSCH.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to UE power control for multiple UL carriers. For example, the memory 710 may store indices, power control parameters, power headroom, configuration and activation/deactivation status for serving cells and/or BWPs, and the like. In certain embodiments, the memory 710 also stores program code and related data, such as an operating system or other controller algorithms operating on the remote unit 105.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to provide UL communication signals to a base unit 110. Similarly, one or more receivers 735 may be used to receive DL communication signals from the base unit 110, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

Figure 8:
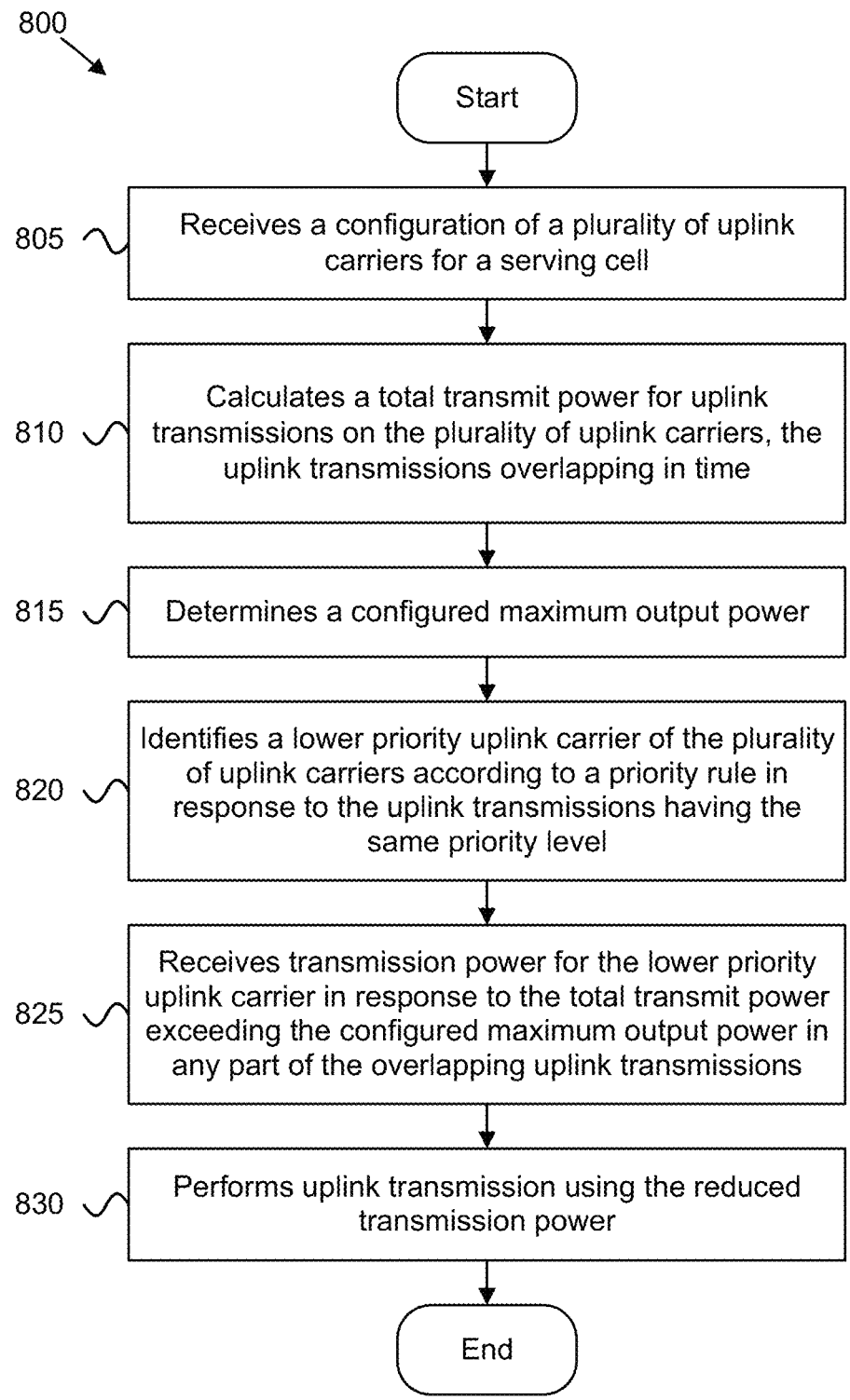
FIG. 8 is a flow chart diagram illustrating one method of UE power control for multiple UL carriers.

FIG. 8 is a schematic flow chart diagram illustrating one embodiment of a method 800 for UE power control for multiple UL carriers, according to embodiments of the disclosure. In some embodiments, the method 800 is performed by a UE, such as the remote unit 105, the UE 205, the UE 405, the UE 505, the UE 605, and/or the user equipment apparatus 700. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a configuration of a plurality of uplink carriers for a serving cell. The method 800 includes calculating 810 a total transmit power for uplink transmissions on the plurality of uplink carriers, the uplink transmissions overlapping in time.

The method 800 includes determining 815 a configured maximum output power. The method 800 includes identifying 820 a lower priority uplink carrier of the plurality of uplink carriers according to a priority rule in response to the uplink transmissions having the same priority level.

The method 800 includes reducing 825 transmission power for the lower priority uplink carrier in response to the total transmit power exceeding the configured maximum output power in any part of the overlapping uplink transmissions. The method 800 includes performing 830 uplink transmission using the reduced transmission power. The method 800 ends.

Figure 9:
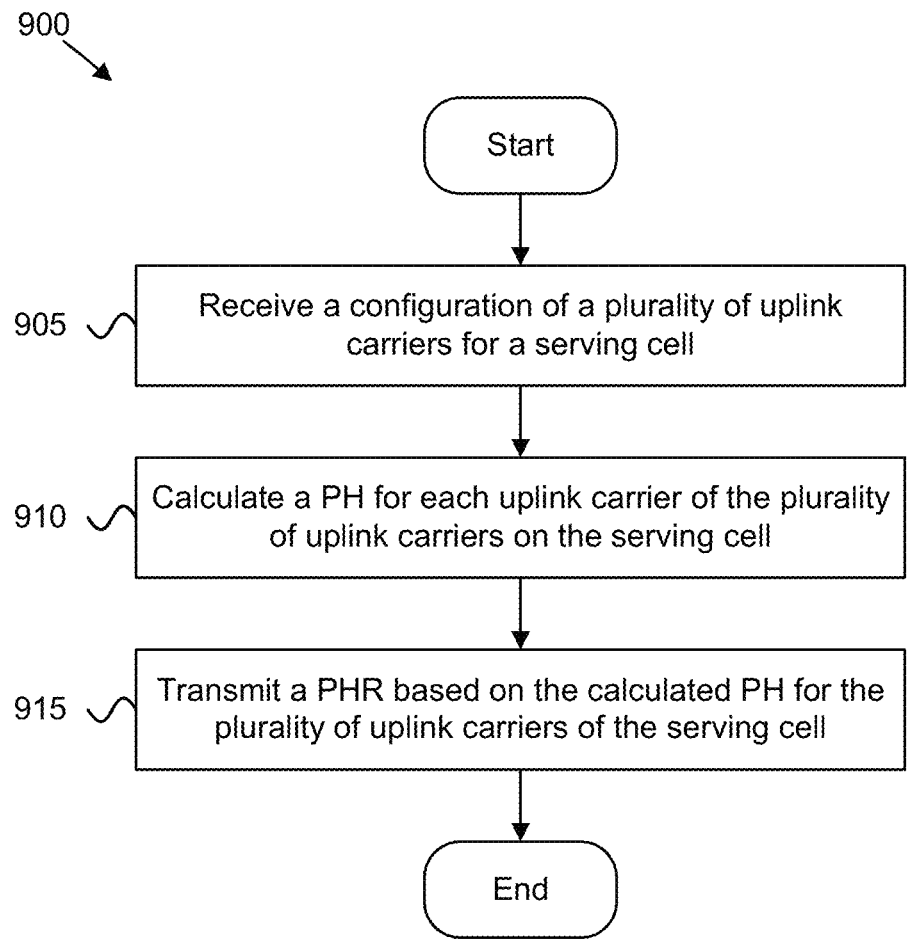
FIG. 9 is a flow chart diagram illustrating another method of UE power control for multiple UL carriers.

FIG. 9 is a schematic flow chart diagram illustrating one embodiment of a method 900 for UE power control for multiple UL carriers, according to embodiments of the disclosure. In some embodiments, the method 900 is performed by a UE, such as the remote unit 105, the UE 205, the UE 405, the UE 505, the UE 605, and/or the user equipment apparatus 700. In certain embodiments, the method 900 may be performed by a processor executing program code, for example, a microcontroller, a microprocessor, a CPU, a GPU, an auxiliary processing unit, a FPGA, or the like.

The method 900 begins and receives 905 a configuration of a plurality of uplink carriers for a serving cell. The method 900 includes calculating 910 a power headroom ("PH") for each uplink carrier of the plurality of uplink carriers on the serving cell. The method 900 includes transmitting 915 a Power Headroom Report ("PHR") based on the calculated PH for the plurality of uplink carriers of the serving cell. The method 900 ends.

Figure 10:
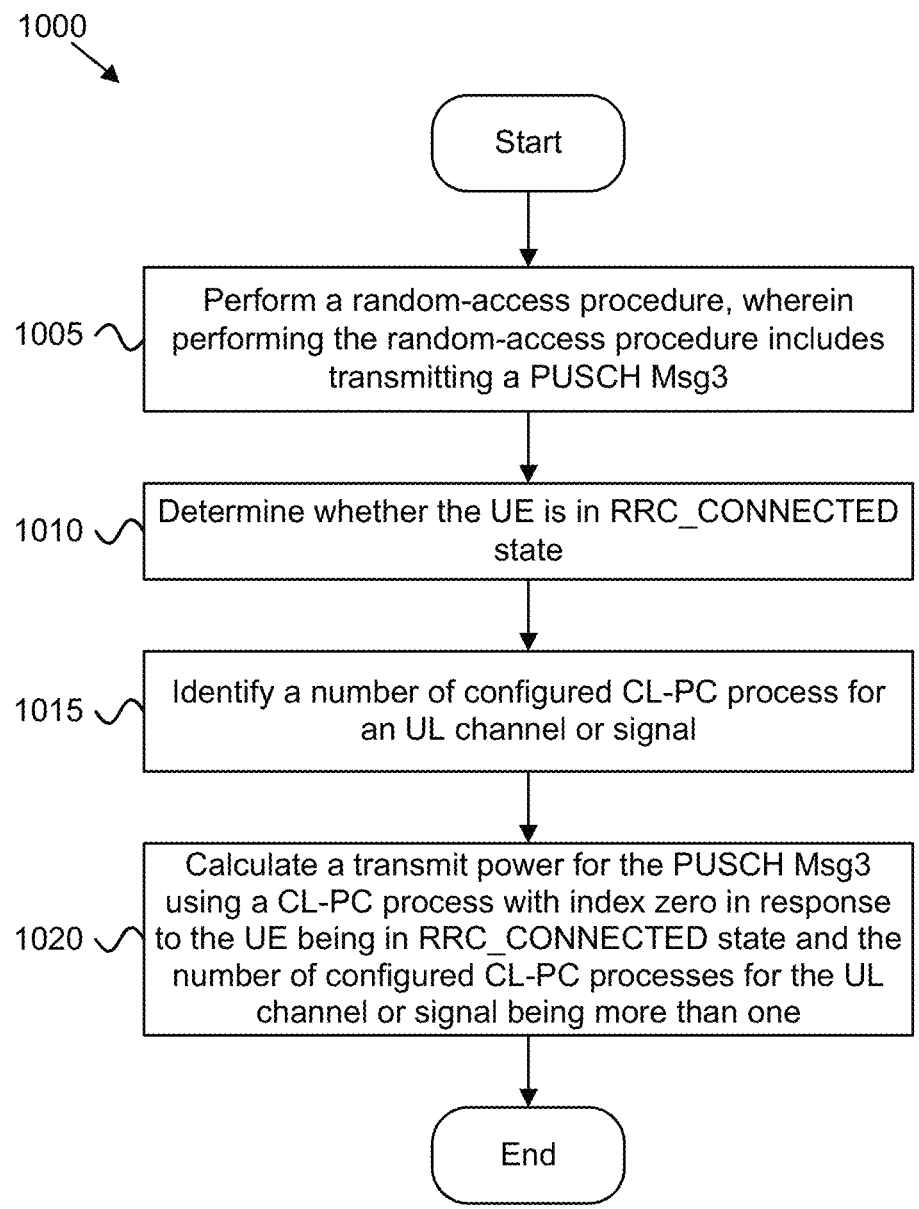
FIG. 10 is a flow chart diagram illustrating yet another method of UE power control for multiple UL carriers.

FIG. 10 is a schematic flow chart diagram illustrating one embodiment of a method 1000 for UE power control for multiple UL carriers, according to embodiments of the disclosure. In some embodiments, the method 1000 is performed by a UE, such as the remote unit 105, the UE 205, the UE 405, the UE 505, the UE 605, and/or the user equipment apparatus 700. In certain embodiments, the method 1000 may be performed by a processor executing program code, for example, a microcontroller, a microprocessor, a CPU, a GPU, an auxiliary processing unit, a FPGA, or the like.

The method 1000 begins and performs 1005 a random-access procedure, wherein performing the random-access procedure includes transmitting a physical uplink shared channel ("PUSCH") Msg3. The method 1000 includes determining 1010 whether the UE is in RRC_CONNECTED state. The method 1000 includes identifying 1015 a number of configured closed-loop power control ("CL-PC") process for an uplink ("UL") channel or signal.

The method includes calculating 1020 a transmit power for the PUSCH Msg3 using a CL-PC process with index zero in response to the UE being in RRC_CONNECTED state and the number of configured CL-PC processes for the UL channel or signal being more than one. The method 1000 ends.

Disclosed herein is a first apparatus for UE power control for multiple UL carriers. In various embodiments, the first apparatus may be a UE, such as the remote unit 105, the UE 205, the UE 405, the UE 505, the UE 605, and/or the user equipment apparatus 700. The first apparatus includes a transceiver that receives a configuration of a plurality of uplink carriers for a serving cell. The first apparatus includes a processor that calculates the total transmit power for uplink transmissions on the plurality of uplink carriers, the uplink transmissions overlapping in time. The processor determines a configured maximum output power and identifies a lower priority uplink carrier of the plurality of uplink carriers according to a priority rule in response to the uplink transmissions having the same priority level. The processor calculates a reduced transmission power for the lower priority uplink carrier in response to the total transmit power exceeding the configured maximum output power in any part of the overlapping uplink transmissions. The transceiver performs uplink transmission using the reduced transmission power.

In various embodiments, reducing transmission power includes at least one of: applying a power down-scaling factor to the lower priority uplink carrier and dropping an uplink transmission of the lower priority uplink carrier. In some embodiments, reducing transmission power includes applying a same power down-scaling factor to uplink carriers that are associated with the same priority level.

In some embodiments, identifying the lower priority uplink carrier of the plurality of uplink carriers according to a priority rule includes the processor determining whether a PUCCH is configured for any of the plurality of uplink carriers and prioritizing power allocation for an uplink carrier configured with PUCCH over an uplink carrier not configured with PUCCH.

In some embodiments, the plurality of uplink carriers includes a SUL carrier and a NUL carrier. In such embodiments, identifying the lower priority uplink carrier of the plurality of uplink carriers according to a priority rule may include the processor prioritizing power allocation for the NUL carrier over the SUL carrier. In certain embodiments, the SUL carrier and the NUL carrier are not configured with PUCCH.

In various embodiments, identifying the lower priority uplink carrier of the plurality of uplink carriers according to a priority rule includes identifying a numerology of each of the plurality of uplink carriers, identifying a service type or traffic type associated with each of the plurality of uplink carriers, identifying—for each of the plurality of uplink carriers—one or more of: a modulation and coding scheme table, a channel quality indicator table, and a target reliability requirement, and identifying an index associated with each of the plurality of uplink carriers.

In some embodiments, the transceiver receives configuration of a first number of uplink carriers of the plurality of uplink carriers, the first number of uplink carriers corresponding to a first number of configured and active uplink bandwidth parts of the serving cell. In such embodiments, reducing transmission power may include applying a same power down-scaling factor to active uplink bandwidth parts that are associated with the same priority level.

In some embodiments, the transceiver receives a configuration of a first number of uplink carriers of the plurality of uplink carriers, the first number of uplink carriers corresponding to a first number of active bandwidth parts of the serving cell, and the processor identifies the lower priority uplink carrier by identifying a lower priority active uplink BWP from the first number of active uplink bandwidth parts according to one or more of: identifying a numerology of each of the first number of active uplink bandwidth parts; identifying a service type or traffic type associated with each of the first number of active uplink bandwidth parts; identifying—for each of the first number of active uplink bandwidth parts—one or more of: a modulation and coding scheme table, a channel quality indicator table, and a target reliability requirement; and identifying an index associated with each of the first number of active uplink bandwidth parts.

Disclosed herein is a first method for UE power control for multiple UL carriers. In various embodiments, the first method is performed by a UE, such as the remote unit 105, the UE 205, the UE 405, the UE 505, the UE 605, and/or the user equipment apparatus 700. The first method includes receiving a configuration of a plurality of uplink carriers for a serving cell and calculating a total transmit power for uplink transmissions on the plurality of uplink carriers, the uplink transmissions overlapping in time. The first method includes determining a configured maximum output power and identifying a lower priority uplink carrier of the plurality of uplink carriers according to a priority rule in response to the uplink transmissions having the same priority level. The first method includes reducing transmission power for the lower priority uplink carrier in response to the total transmit power exceeding the configured maximum output power in any part of the overlapping uplink transmissions and performing uplink transmission using the reduced transmission power.

In various embodiments of the first method, reducing transmission power includes at least one of: applying a power down-scaling factor to the lower priority uplink carrier and dropping an uplink transmission of the lower priority uplink carrier. In certain embodiments of the first method reducing transmission power includes applying a same power down-scaling factor to uplink carriers that are associated with the same priority level.

In some embodiments of the first method, identifying the lower priority uplink carrier of the plurality of uplink carriers according to a priority rule includes: determining whether a PUCCH is configured for any of the plurality of uplink carriers and prioritizing power allocation for an uplink carrier configured with PUCCH over an uplink carrier not configured with PUCCH.

In some embodiments, the plurality of uplink carriers includes a SUL carrier and a NUL carrier. In such embodiments, identifying the lower priority uplink carrier of the plurality of uplink carriers according to a priority rule includes prioritizing power allocation for the NUL carrier over the SUL carrier. In certain embodiments, the SUL carrier and the NUL carrier are not configured with PUCCH.

In various embodiments, identifying the lower priority uplink carrier of the plurality of uplink carriers according to a priority rule includes identifying a numerology of each of the plurality of uplink carriers; identifying a service type or traffic type associated with each of the plurality of uplink carriers; identifying an index associated with each of the plurality of uplink carriers; and/or identifying—for each of the plurality of uplink carriers—one or more of: a modulation and coding scheme table, a channel quality indicator table, and a target reliability requirement.

In some embodiments, receiving the configuration of the plurality of uplink carriers for a serving cell includes receiving configuration of a first number of uplink carriers of the plurality of uplink carriers, the first number of uplink carriers corresponding to a first number of configured and active uplink bandwidth parts of a first uplink carrier of the serving cell. In some embodiments, reducing transmission power includes applying a same power down-scaling factor to uplink carriers that are associated with the same priority level.

In some embodiments, receiving the configuration of the plurality of uplink carriers for a serving cell includes receiving a configuration of a first number of uplink carriers of the plurality of uplink carriers, the first number of uplink carriers corresponding to a first number of active bandwidth parts of the serving cell. In such embodiments, identifying the lower priority uplink carrier of the plurality of uplink carriers may include identifying a lower priority active uplink BWP from the first number of active uplink bandwidth parts according to one or more of: identifying a numerology of each of the first number of active uplink bandwidth parts; identifying a service type or traffic type associated with each of the first number of active uplink bandwidth parts; identifying—for each of the first number of active uplink bandwidth parts—one or more of: a modulation and coding scheme table, a channel quality indicator table, and a target reliability requirement; and identifying an index associated with each of the first number of active uplink bandwidth parts.

Disclosed herein is a second apparatus for UE power control for multiple UL carriers. In various embodiments, the second apparatus may be a UE, such as the remote unit 105, the UE 205, the UE 405, the UE 505, the UE 605, and/or the user equipment apparatus 700. The second apparatus includes a transceiver that receives a configuration of a plurality of uplink carriers for a serving cell. The second apparatus includes a processor that calculates a PH for each uplink carrier of the plurality of uplink carriers on the serving cell. The second apparatus controls the transceiver to transmit a PHR based on the calculated PH for the plurality of uplink carriers of the serving cell.

In some embodiments, the processor determines a configured maximum output power for the uplink carrier from the plurality of uplink carriers of the serving cell. In such embodiments, the PH for an uplink carrier from the plurality of uplink carriers on the serving cell indicates a difference between the configured maximum output power for the uplink carrier and a determined transmit power required for an UL transmission on the uplink carrier.

In some embodiments, the processor determines a default power control parameter set for the serving cell. In such embodiments, the PHR may include a single PH. Further, calculating the PH may include calculating a virtual PH in response to no UL transmission on any uplink carrier from the plurality of uplink carriers of the serving cell at a time when the PHR is calculated. Here, the virtual PH may be based on the default power control parameter set.

In certain embodiments, the default parameter control parameter set includes one or more of an open-loop parameter set, a closed-loop process, and a pathloss RS. In certain embodiments, the default power control parameter set corresponds to an UL carrier on which PUCCH is semi-statically configured.

In some embodiments, only a first uplink carrier of the plurality of uplink carriers is semi-statically configured for PUSCH, wherein the default power control parameter set corresponds to the first UL carrier. In some embodiments, the default power control parameter set corresponds to an UL carrier with CIF index zero. In some embodiments, the plurality of uplink carriers includes a SUL carrier and a NUL carrier, wherein the default power control parameter set corresponds to the NUL carrier.

In various embodiments, the PHR corresponds to one or more of: a PUSCH PHR, a PUCCH PHR, and an SRS PHR.

In some embodiments, the transceiver receives configuration of a first number of uplink carriers of the plurality of uplink carriers, the first number of uplink carriers corresponds to a first number of configured and active uplink bandwidth parts of the serving cell. In such embodiments, the processor may determine a default power control parameter set for the serving cell. Here, the PHR includes a single PH. Moreover, the processor may calculate the PH by calculating a virtual PH in response to no UL transmission on any active BWP from the first number of active uplink bandwidth parts of the serving cell at a time when the PHR is prepared, wherein the virtual PH is based on the default power control parameter set.

In certain embodiments, the default power control parameter set corresponds to the active UL BWP. In certain embodiments, the default power control parameter set corresponds to one of: an initial UL BWP and a default UL BWP, wherein the default UL BWP is an UL BWP linked to a default DL BWP. In certain embodiments, the default power control parameter set corresponds to one of: a UL BWP having a smallest BWP index, an UL BWP having a smallest numerology, an UL BWP associated with a service type or traffic type, and an UL BWP associated with a modulation and coding scheme table, an UL BWP associated with a channel quality indicator table, an UL BWP associated with a target reliability requirement, or combination thereof.

In some embodiments, the PHR includes a plurality of PH fields, wherein a PH field includes one or more of a PH, a configured maximum output power, and an UL BWP index. In certain embodiments, the configured maximum output power for the UL BWP may be determined based on power reduction factors, wherein power reduction factors for a first UL BWP are different from power reduction factors for a second UL BWP, wherein the first UL BWP and the second UL BWP are different.

In certain embodiments, the configured maximum output power for the UL BWP may be determined based on power reduction factors, wherein power reduction factors for a first UL BWP are the same as power reduction factors for a second UL BWP, wherein the first UL BWP and the second UL BWP are different. In certain embodiments, the configured maximum output power for the UL BWP may be determined based on a maximum allowed UE output power ("$P_{EMAX}$"), wherein a first UL BWP has a first $P_{EMAX}$ and a second UL BWP has a second $P_{EMAX}$, wherein the first $P_{EMAX}$ is a different value than the second $P_{EMAX}$ and the first UL BWP and the second UL BWP are different.

In certain embodiments, the PHR includes a first PH for a first active UL BWP and a second PH for a second active UL BWP, in response to the first active UL BWP and the second active UL BWP being associated with one or more of: different configured maximum output power, different pathloss references, and non-Quasi Co-Located pathloss references, wherein the first active UL BWP is different from the second active UL BWP.

In some embodiments, the processor calculates a differential PH, the differential PH being a difference between a PH for a second active UL BWP and a PH for a first active UL BWP, wherein the first active UL BWP is different from the second active UL BWP. In such embodiments, the PHR may include the PH for the first active UL BWP and the differential PH for the second active UL BWP, in response to the first active UL BWP and the second active UL BWP having one or more of: the same configured maximum output power, the same pathloss references, and quasi-co-located pathloss references.

In certain embodiments, the PHR includes a PH for a first active UL BWP and a second active UL BWP in response to the first active UL BWP and the second active UL BWP having one or more of: the same configured maximum output power, the same pathloss references, and quasi-co-located pathloss references. Here, the first active UL BWP is different from the second active UL BWP. In such embodiments, the PH is calculated with respect to the first UL BWP.

In certain embodiments, the PHR includes a PH for a first active UL BWP and a second active UL BWP. Here, the PH may be calculated as a difference between the configured UE maximum transmit power of a serving cell and a sum of transmit powers for uplink transmissions on the first active UL BWP and the second UL BWP. In such embodiments, the transmit powers for uplink transmissions include a first transmit power with respect to a first reference uplink transmission on the first active UL BWP and a second transmit power with respect to a second reference uplink transmission on the second active UL BWP.

In some embodiments, the transceiver receives a configuration for a power headroom BWP-group. In one embodiment, receiving the configuration for PH BWP-group includes receiving an 'allowedPHTriggeringGroup' parameter. Here, the processor detects that a MAC entity has UL resources for new transmission and determines whether a PHR backoff timer is expired (e.g., phr-ProhibitTimer).

In such embodiments, the processor may trigger a PHR in response to expiration of the PHR backoff timer and in response to a path loss having changed more than a threshold amount for at least one active BWP belonging to the PH BWP-group of a serving cell (e.g., of any MAC entity which is used as a pathloss reference) since a last transmission of a PHR in the MAC entity. In certain embodiments, the threshold amount is indicated by the parameter 'phr-Tx-PowerFactorChange.'

In some embodiments, the transceiver receives a configuration for a pathloss-change-threshold parameter (e.g., 'dl-PathlossChange' parameter). Here, the processor detects that a MAC entity has UL resources for new transmission and determines whether a PHR backoff timer is expired (e.g., phr-ProhibitTimer).

In such embodiments, the processor triggers a PHR in response to expiration of the PHR backoff timer and in response to a path loss having changed more than a threshold amount for at least one active UL BWP of a serving cell (e.g., of any MAC entity which is used as a pathloss reference) since a last transmission of a PHR in the MAC entity. Here, the threshold amount is configured for the at least one active UL BWP. In certain embodiments, the threshold amount is a BWP-specific configuration. The threshold amount may be indicated by the parameters 'dl-PathlossChange' and/or 'phr-Tx-PowerFactorChange.'

In some embodiments, the processor communicates on a first active UL BWP in a serving cell configured with a plurality of UL BWPs and the processor switches from the first active UL BWP to a second active UL BWP. Here, the first active UL BWP and second active UL BWP share a CL-PC process. Moreover, the processor selectively resets the CL-PC process in response to switching BWPs.

In certain embodiments, selectively resetting the CL-PC process includes resetting the CL-PC process in response to a frequency distance between the first BWP and the second BWP being larger than a threshold value and carrying-over the CL-PC process in response to the frequency distance not being larger than the threshold value.

In certain embodiments, selectively resetting the CL-PC process includes determining a pathloss reference for the first and second BWPs. The processor carries-over the CL-PC process in response to the pathloss references being the same values or having a quasi-co-location relationship for the first and second BWPs and resets the CL-PC process in response to the pathloss references not being the same values and not having a quasi-co-location relationship for the first and second BWPs.

In certain embodiments, selectively resetting the CL-PC process includes determining a set of quality parameters for the first and second BWPs, the set of quality parameters including one or more of: a set of open-loop power control parameters, a modulation and coding scheme table, a channel quality indicator table, a target reliability requirement, an associated service type or traffic type, and an associated numerology. Here, the processor resets the CL-PC process in response to the set of quality parameters not being the same values for the first and second BWPs. In such embodiments, a selection of one or more of: the modulation and coding scheme table, the channel quality indicator table, the target reliability requirement, the associated service type or traffic type is based on a received DCI.

Disclosed herein is a second method for UE power control for multiple UL carriers. In various embodiments, the second method is performed by a UE, such as the remote unit 105, the UE 205, the UE 405, the UE 505, the UE 605, and/or the user equipment apparatus 700. The second method includes receiving a configuration of a plurality of uplink carriers for a serving cell and calculating a PH for each uplink carrier of the plurality of uplink carriers on the serving cell. The second method includes transmitting a PHR based on the calculated PH for the plurality of uplink carriers of the serving cell.

In some embodiments, the second method includes determining a configured maximum output power for the uplink carrier from the plurality of uplink carriers of the serving cell. In such embodiments, the PH for an uplink carrier from the plurality of uplink carriers on the serving cell indicates a difference between the configured maximum output power for the uplink carrier and a determined transmit power required for an UL transmission on the uplink carrier.

In some embodiments, the second method includes determining a default power control parameter set for the serving cell. In such embodiments, the PHR includes a single PH. Here, calculating the PH may include calculating a virtual PH in response to no UL transmission on any uplink carrier from the plurality of uplink carriers of the serving cell at a time when the PHR is calculated, wherein the virtual PH is based on the default power control parameter set.

In certain embodiments, the default parameter control parameter set includes one or more of: an open-loop parameter set, a closed-loop process, and a pathloss RS. In certain embodiments, the default power control parameter set corresponds to an UL carrier on which PUCCH is semi-statically configured. In certain embodiments, only a first uplink carrier of the plurality of uplink carriers is semi-statically configured for PUSCH, wherein the default power control parameter set corresponds to the first UL carrier.

In certain embodiments, the default power control parameter set corresponds to an UL carrier with CIF index zero. In certain embodiments, the plurality of uplink carriers includes a SUL carrier and a NUL carrier, wherein the default power control parameter set corresponds to the NUL carrier.

In various embodiments, the PHR corresponds to one or more of: a PUSCH PHR, a PUCCH PHR, and an SRS PHR.

In some embodiments, receiving the configuration of the plurality of uplink carriers for a serving cell includes receiving configuration of a first number of uplink carriers of the plurality of uplink carriers, the first number of uplink carriers corresponds to a first number of configured and active uplink bandwidth parts of the serving cell. In such embodiments, the second method may include determining a default power control parameter set for the serving cell. Here, the PHR includes a single PH. Moreover, calculating the PH includes calculating a virtual PH in response to no UL transmission on any active BWP from the first number of active uplink bandwidth parts of the serving cell at a time when the PHR is prepared, wherein the virtual PH is based on the default power control parameter set.

In certain embodiments, the default power control parameter set corresponds to the active UL BWP. In certain embodiments, the default power control parameter set corresponds to one of: an initial UL BWP and a default UL BWP, wherein the default UL BWP is an UL BWP linked to a default DL BWP. In certain embodiments, the default power control parameter set corresponds to one of: a UL BWP having a smallest BWP index, an UL BWP having a smallest numerology, an UL BWP associated with a service type or traffic type, and an UL BWP associated with a modulation and coding scheme table, an UL BWP associated with a channel quality indicator table, an UL BWP associated with a target reliability requirement, or combination thereof.

In some embodiments, the PHR includes a plurality of PH fields, wherein a PH field includes one or more of a PH, a configured maximum output power, and an UL BWP index. In certain embodiments, the configured maximum output power for the UL BWP may be determined based on power reduction factors, wherein power reduction factors for a first UL BWP are different from power reduction factors for a second UL BWP, wherein the first UL BWP and the second UL BWP are different.

In certain embodiments, the configured maximum output power for the UL BWP may be determined based on power reduction factors, wherein power reduction factors for a first UL BWP are the same as power reduction factors for a second UL BWP, wherein the first UL BWP and the second UL BWP are different. In certain embodiments, the configured maximum output power for the UL BWP may be determined based on a maximum allowed UE output power ("$P_{EMAX}$"), wherein a first UL BWP has a first $P_{EMAX}$ and a second UL BWP has a second $P_{EMAX}$, wherein the first $P_{EMAX}$ is a different value than the second $P_{EMAX}$ and the first UL BWP and the second UL BWP are different.

In certain embodiments, the PHR includes a first PH for a first active UL BWP and a second PH for a second active UL BWP, in response to the first active UL BWP and the second active UL BWP being associated with one or more of: different configured maximum output power, different pathloss references, and non-Quasi Co-Located pathloss references, wherein the first active UL BWP is different from the second active UL BWP.

In some embodiments, the second method includes calculating a differential PH, the differential PH being a difference between a PH for a second active UL BWP and a PH for a first active UL BWP, wherein the first active UL BWP is different from the second active UL BWP. In such embodiments, the PHR may include the PH for the first active UL BWP and the differential PH for the second active UL BWP, in response to the first active UL BWP and the second active UL BWP having one or more of: the same configured maximum output power, the same pathloss references, and quasi-co-located pathloss references.

In certain embodiments, the PHR includes a PH for a first active UL BWP and a second active UL BWP in response to the first active UL BWP and the second active UL BWP having one or more of: the same configured maximum output power, the same pathloss references, and quasi-co-located pathloss references. Here, the first active UL BWP is different from the second active UL BWP. In such embodiments, the PH is calculated with respect to the first UL BWP.

In certain embodiments, the PHR includes a PH for a first active UL BWP and a second active UL BWP. Here, the PH may be calculated as a difference between the configured UE maximum transmit power of a serving cell and a sum of transmit powers for uplink transmissions on the first active UL BWP and the second UL BWP. In such embodiments, the transmit powers for uplink transmissions include a first transmit power with respect to a first reference uplink transmission on the first active UL BWP and a second transmit power with respect to a second reference uplink transmission on the second active UL BWP.

In certain embodiments, the second method includes receiving a configuration for a power headroom BWP-group. In one embodiment, receiving the configuration for PH BWP-group includes receiving an 'allowedPHTriggeringGroup' parameter. Here, the second method also includes detecting that a MAC entity has UL resources for new transmission and determining whether a PHR backoff timer is expired (e.g., phr-ProhibitTimer).

In such embodiments, the second method may include triggering a PHR in response to expiration of the PHR backoff timer and in response to a path loss having changed more than a threshold amount for at least one active BWP belonging to the PH BWP-group of a serving cell (e.g., of any MAC entity which is used as a pathloss reference) since a last transmission of a PHR in the MAC entity. In certain embodiments, the threshold amount is indicated by the parameter 'phr-Tx-PowerFactorChange.'

In some embodiments, the transceiver receives a configuration for a pathloss-change-threshold parameter (e.g., 'dl-PathlossChange' parameter). Here, the second method also includes detecting that a MAC entity has UL resources for new transmission and determining whether a PHR backoff timer is expired (e.g., phr-ProhibitTimer).

In such embodiments, the second method may include triggering a PHR in response to expiration of the PHR backoff timer and in response to a path loss having changed more than a threshold amount for at least one active UL BWP of a serving cell (e.g., of any MAC entity which is used as a pathloss reference) since a last transmission of a PHR in the MAC entity. Here the threshold amount is configured for the at least one active UL BWP. In certain embodiments, the threshold amount is a BWP-specific configuration. The threshold amount may be indicated by the parameters 'dl-PathlossChange' and/or 'phr-Tx-PowerFactorChange.'

In some embodiments, the second method includes communicating on a first active UL BWP in a serving cell configured with a plurality of UL BWPs. The second method further includes switching from the first active UL BWP to a second active UL BWP, wherein the first active UL BWP and second active UL BWP share a CL-PC process and selectively resetting the CL-PC process in response to switching BWPs.

In certain embodiments, selectively resetting the CL-PC process includes resetting the CL-PC process in response to a frequency distance between the first BWP and the second BWP being larger than a threshold value and carrying-over the CL-PC process in response to the frequency distance not being larger than the threshold value.

In certain embodiments, selectively resetting the CL-PC process includes determining a pathloss reference for the first and second BWPs, carrying-over the CL-PC process in response to the pathloss references being the same values or having a quasi-co-location relationship for the first and second BWPs, and resetting the CL-PC process in response to the pathloss references not being the same values and not having a quasi-co-location relationship for the first and second BWPs.

In certain embodiments, selectively resetting the CL-PC process includes determining a set of quality parameters for the first and second BWPs, the set of quality parameters including one or more of: a set of open-loop power control parameters, a modulation and coding scheme table, a channel quality indicator table, a target reliability requirement, an associated service type or traffic type, and an associated numerology. Here, selectively resetting the CL-PC process also includes resetting the CL-PC process in response to the set of quality parameters not being the same values for the first and second BWPs. In such embodiments, a selection of one or more of: the modulation and coding scheme table, the channel quality indicator table, the target reliability requirement, the associated service type or traffic type is based on a received DCI.

Disclosed herein is a third apparatus for UE power control for multiple UL carriers. In various embodiments, the third apparatus may be a UE, such as the remote unit 105, the UE 205, the UE 405, the UE 505, the UE 605, and/or the user equipment apparatus 700. The third apparatus includes a transceiver that performs a random-access procedure. Here, performing the random-access procedure includes transmitting a PUSCH Msg3. The third apparatus includes a processor that determines whether the UE is in the RRC_CONNECTED state and identifies a number of configured CL-PC process for an UL channel or signal. The processor calculates the transmit power for the PUSCH Msg3 using a CL-PC process with index zero in response to the UE being in the RRC_CONNECTED state and in response to the number of configured CL-PC processes for the UL channel or signal being more than one.

In some embodiments, the processor determines whether a PUCCH transmission lacks an explicit beam indication and calculates the transmit power for the PUSCH Msg3 using a CL-PC process with index zero in response to the PUCCH transmission lacking an explicit beam indication. In some embodiments, the transceiver receives a RAR when performing the random-access procedure and the processor resets a CL-PC accumulation for a CL-PC process with index zero in response to receiving the RAR.

Disclosed herein is a third method for UE power control for multiple UL carriers. In various embodiments, the third method is performed by a UE, such as the remote unit 105, the UE 205, the UE 405, the UE 505, the UE 605, and/or the user equipment apparatus 700. The third method includes performing a random-access procedure, wherein performing the random-access procedure includes transmitting a PUSCH Msg3. The third method includes determining whether the UE is in the RRC_CONNECTED state and identifying a number of configured CL-PC process for an UL channel or signal. The third method includes calculating the transmit power for the PUSCH Msg3 using a CL-PC process with index zero in response to the UE being in the RRC_CONNECTED state and in response to the number of configured CL-PC processes for the UL channel or signal being more than one.

In some embodiments, the third method includes determining whether a PUCCH transmission lacks an explicit beam indication and calculating the transmit power for the PUSCH Msg3 using a CL-PC process with index zero in response to the PUCCH transmission lacking an explicit beam indication. In some embodiments, the third method includes receiving a RAR when performing the random-access procedure and resetting a CL-PC accumulation for a CL-PC process with index zero in response to receiving the RAR.

Disclosed herein is a fourth apparatus for UE power control. In various embodiments, the fourth apparatus may be a UE, such as the remote unit 105, the UE 205, the UE 405, the UE 505, the UE 605, and/or the user equipment apparatus 700. The fourth apparatus includes a transceiver that receives a plurality of target reliability configurations. Here, each of the plurality of target reliability configurations includes at least one of: a modulation and coding scheme (MCS) table, a channel quality indicator (CQI) table, and an associated radio network temporary identifier.

The fourth apparatus includes a processor that performs a first uplink transmission of an uplink channel based on a first target reliability configuration and a power control adjustment state of the uplink channel and receiving an indication for a second uplink transmission of the uplink channel. Here, the second uplink transmission of the uplink channel is based on a second target reliability configuration and the power control adjustment state of the uplink channel. The processor determines whether the second target reliability configuration is different than the first target reliability configuration and resets the power control adjustment state of the uplink channel in response to the determination that the second target reliability configuration is different than the first target reliability configuration. The processor controls the transceiver to perform the second uplink transmission of the uplink channel based on the second target reliability configuration and the reset power control adjustment state of the uplink channel.

In some embodiments, each of the plurality of target reliability configurations further includes an associated downlink control information (DCI) format. In some embodiments, each of the plurality of target reliability configurations further includes a set of power control parameters. In such embodiments, the set of power control parameters may include at least one of a power spectral density per subcarrier spacing and a pathloss compensation parameter.

In certain embodiments, the uplink channel is a physical uplink shared channel (PUSCH). In some embodiments, the transceiver further receives an indication that the second uplink transmission of the uplink channel is based on the second target reliability configuration via downlink control information.

Disclosed herein is a fourth method for UE power control. In various embodiments, the fourth method is performed by a UE, such as the remote unit 105, the UE 205, the UE 405, the UE 505, the UE 605, and/or the user equipment apparatus 700. The fourth method includes receiving a plurality of target reliability configurations. Here, each of the plurality of target reliability configurations includes at least one of: a modulation and coding scheme (MCS) table, a channel quality indicator (CQI) table, and an associated radio network temporary identifier. The fourth method includes performing a first uplink transmission of an uplink channel based on a first target reliability configuration and a power control adjustment state of the uplink channel and receiving an indication for a second uplink transmission of the uplink channel, wherein the second uplink transmission of the uplink channel is based on a second target reliability configuration and the power control adjustment state of the uplink channel.

The fourth method includes determining whether the second target reliability configuration is different than the first target reliability configuration and resetting the power control adjustment state of the uplink channel in response to the determination that the second target reliability configuration is different than the first target reliability configuration. The fourth method includes performing the second uplink transmission of the uplink channel based on the second target reliability configuration and the reset power control adjustment state of the uplink channel.

In some embodiments, each of the plurality of target reliability configurations further includes an associated downlink control information (DCI) format. In some embodiments, each of the plurality of target reliability configurations further includes a set of power control parameters. In such embodiments, the set of power control parameters may include at least one of a power spectral density per subcarrier spacing and a pathloss compensation parameter.

In certain embodiments, the uplink channel is a physical uplink shared channel (PUSCH). In some embodiments, the fourth method further includes receiving an indication that the second uplink transmission of the uplink channel is based on the second target reliability configuration via downlink control information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of a UE comprising:
   performing a random-access procedure, wherein performing the random-access procedure includes transmitting a physical uplink shared channel ("PUSCH") Msg3;
   determining whether the UE is in RRC_CONNECTED state;
   identifying a number of configured closed-loop power control ("CL-PC") process for an uplink ("UL") channel or signal; and
   calculating a transmit power for the PUSCH Msg3 using a CL-PC process with index zero in response to the UE being in RRC_CONNECTED state and the number of configured CL-PC processes for the UL channel or signal being more than one.

2. The method of claim 1, further comprising:
   determining whether a physical uplink control channel ("PUCCH") transmission lacks an explicit beam indication; and
   calculating the transmit power for the PUSCH Msg3 using a CL-PC process with index zero in response to the PUCCH transmission lacking an explicit beam indication.

3. The method of claim 1, further comprising:
   receiving a random access response ("RAR") when performing the random-access procedure; and
   resetting a CL-PC accumulation for a CL-PC process with index zero in response to receiving the RAR.

4. An apparatus comprising:
   a transceiver that performs a random-access procedure, wherein performing the random-access procedure includes transmitting a physical uplink shared channel ("PUSCH") Msg3; and
   a processor that:
   determines whether the apparatus is in RRC_CONNECTED state;
   identifies a number of configured closed-loop power control ("CL-PC") process for an uplink ("UL") channel or signal; and
   calculates a transmit power for the PUSCH Msg3 using a CL-PC process with index zero in response to the apparatus being in RRC_CONNECTED state and the number of configured CL-PC processes for the UL channel or signal being more than one.

5. The apparatus of claim 4, wherein the processor further:
   determines whether a physical uplink control channel ("PUCCH") transmission lacks an explicit beam indication; and
   calculates the transmit power for the PUSCH Msg3 using a CL-PC process with index zero in response to the PUCCH transmission lacking an explicit beam indication.

6. The apparatus of claim 4,
   wherein the transceiver receives a random access response ("RAR") when performing the random-access procedure, and
   wherein the processor resets a CL-PC accumulation for a CL-PC process with index zero in response to receiving the RAR.

* * * * *